US012666471B2

(12) United States Patent
Ha et al.

(10) Patent No.: US 12,666,471 B2
(45) Date of Patent: Jun. 23, 2026

(54) WIRELESS CHARGING METHOD AND ELECTRONIC DEVICE SUPPORTING SAME

(71) Applicant: Samsung Electronics Co., Ltd., Suwon-si (KR)

(72) Inventors: Jaemu Ha, Suwon-si (KR); Hyungjun Kwon, Suwon-si (KR); Jaesung Lee, Suwon-si (KR); Juhyang Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 425 days.

(21) Appl. No.: 18/324,094

(22) Filed: May 25, 2023

(65) Prior Publication Data

US 2023/0300911 A1      Sep. 21, 2023

Related U.S. Application Data

(63) Continuation of application No. PCT/KR2021/016965, filed on Nov. 18, 2021.

(30) Foreign Application Priority Data

Nov. 30, 2020      (KR) ........................ 10-2020-0165039

(51) Int. Cl.
*H04W 76/10* (2018.01)
*H02J 7/02* (2016.01)
(Continued)

(52) U.S. Cl.
CPC ............... *H04W 76/10* (2018.02); *H02J 7/47* (2026.01); *H02J 50/10* (2016.02); *H02J 50/80* (2016.02); *H04B 5/266* (2024.01); *H04B 5/79* (2024.01)

(58) Field of Classification Search
None
See application file for complete search history.

(56) References Cited

U.S. PATENT DOCUMENTS 9,391,671 B2 * 7/2016 Kim ......................... H04B 5/79
9,608,480 B2 * 3/2017 Lee ........................ H04B 5/266
(Continued)

FOREIGN PATENT DOCUMENTS

KR      10-2015-0051923 A      5/2015
KR      10-2016-0025261 A      3/2016
(Continued)

OTHER PUBLICATIONS

Office Action for KR 10-2020-0165039 by Korean Intellectual Property Office dated Mar. 27, 2025.
(Continued)

*Primary Examiner* — Tuan A Tran
(74) *Attorney, Agent, or Firm* — Jefferson IP Law, LLP

(57) ABSTRACT

Disclosed is an electronic device comprising a power reception coil, a first communication circuit supporting first communication in a first frequency band, a second communication circuit supporting second communication in a second frequency band, and a control circuit, wherein the control circuit is configured to: receive a first signal including a first identification information from an external electronic device using the first communication; detect a second signal of the external electronic device including a second identification information using the second communication; when the first and second identification information match, transmit a third signal to the external electronic device using the first communication, the third signal requests a connection to the external electronic device; connect to the external electronic device via the second communication in a response to the request; and transmit or receive data used to (Continued)

receive power to and from the external electronic device using the second communication.

14 Claims, 10 Drawing Sheets

(51) Int. Cl.

| | | |
|---|---|---|
| *H02J 7/47* | (2026.01) |
| *H02J 50/10* | (2016.01) |
| *H02J 50/80* | (2016.01) |
| *H04B 5/00* | (2024.01) |
| *H04B 5/26* | (2024.01) |
| *H04B 5/79* | (2024.01) |

(56) References Cited

U.S. PATENT DOCUMENTS

| | | | | |
|---|---|---|---|---|
| 9,729,000 | B2 * | 8/2017 | Lee | H02J 7/0044 |
| 9,866,281 | B2 * | 1/2018 | Won | H02J 7/00034 |
| 9,923,603 | B2 * | 3/2018 | Won | H02J 50/80 |
| 9,941,742 | B2 | 4/2018 | Park | |
| 9,948,148 | B2 * | 4/2018 | Shichino | H02J 50/12 |
| 9,961,529 | B2 * | 5/2018 | England | G06Q 20/1085 |
| 10,148,135 | B2 * | 12/2018 | Elad | H02J 50/80 |
| 10,256,655 | B2 | 4/2019 | Yoon | |
| 10,483,801 | B2 | 11/2019 | Bennett | |
| 10,491,017 | B2 | 11/2019 | Colosimo et al. | |
| 10,581,491 | B2 * | 3/2020 | Won | H02J 50/90 |
| 10,608,472 | B2 | 3/2020 | Lee | |
| 10,742,051 | B2 * | 8/2020 | Colosimo | H02J 7/0048 |
| 10,749,367 | B2 * | 8/2020 | Kim | H02J 50/12 |
| 10,958,094 | B2 | 3/2021 | Choi et al. | |
| 11,101,703 | B2 * | 8/2021 | Shichino | H02J 50/80 |
| 11,128,157 | B2 * | 9/2021 | Colosimo | H02J 50/12 |
| 11,503,447 | B2 * | 11/2022 | Moritomo | H02J 7/00034 |
| 11,750,245 | B2 * | 9/2023 | Shichino | H04B 1/3827 |
| | | | | 307/104 |
| 11,973,353 | B2 * | 4/2024 | Kim | H02J 50/10 |
| 12,095,280 | B2 * | 9/2024 | Park | H01F 38/14 |
| 2012/0248891 | A1 | 10/2012 | Drennen | |
| 2017/0047784 | A1 * | 2/2017 | Jung | H02J 50/80 |
| 2017/0237301 | A1 * | 8/2017 | Elad | H02J 7/00034 |
| | | | | 307/104 |
| 2018/0138749 | A1 * | 5/2018 | Lee | H02J 50/12 |
| 2019/0058360 | A1 | 2/2019 | Garbus et al. | |
| 2019/0058506 | A1 | 2/2019 | Lee | |
| 2019/0148966 | A1 | 5/2019 | Choi et al. | |
| 2019/0363758 | A1 * | 11/2019 | Shichino | G06K 19/07 |

FOREIGN PATENT DOCUMENTS

| | | | |
|---|---|---|---|
| KR | 10-2016-0072688 | A | 6/2016 |
| KR | 10-2016-0125636 | A | 11/2016 |
| KR | 10-2017-0107199 | A | 9/2017 |
| KR | 10-2042658 | B1 | 11/2019 |
| KR | 10-2020-0012534 | A | 2/2020 |
| KR | 10-2020-0042268 | A | 4/2020 |
| KR | 10-2020-0101249 | A | 8/2020 |

OTHER PUBLICATIONS

Korean Office Action dated Nov. 19, 2025, issued in Korean Application No. 10-2020-0165039.

International Search Report for PCT/KR2021/016965 by Korean Intellectual Property Office dated Mar. 11, 2022.

Korean Notice of Patent Grant dated Mar. 16, 2026, issued in Korean Application No. 10-2020-0165039.

* cited by examiner

100

302

301

WIRELESS CHARGING METHOD AND ELECTRONIC DEVICE SUPPORTING SAME

CROSS-REFERENCE TO RELATED APPLICATION(S)

This application is a continuation of International Application No. PCT/KR2021/016965, filed on Nov. 18, 2021, which is based on and claims the benefit of Korean Patent Application No. 10-2020-0165039, filed on Nov. 30, 2020, in the Korean Intellectual Property Office, the entire contents of which are hereby incorporated by reference.

TECHNICAL FIELD

Various embodiments disclosed herein relate to a wireless charging method and an electronic device supporting the same.

BACKGROUND ART

An electronic device may support a wireless charging function based on a magnetic induction scheme, a magnetic resonance scheme, or an electromagnetic wave scheme. The wireless charging function may charge a battery of an external electronic device by wirelessly transmitting power to the external electronic device, or may charge a mounted battery by wirelessly receiving power from the external electronic device.

In a wireless charging operation, an electronic device and an external electronic device may transmit or receive a signal (or data) related to the wireless charging via in-band communication using a frequency in a band which is the same as or adjacent to a frequency used to share power (e.g., transmit power and receive power). However, a signal (or data) transmitted or received based on the in-band communication may interfere with a power signal for power sharing, which may reduce the gain of the power signal or the reliability of wireless charging. Therefore, during a wireless charging operation, switching from in-band communication to out-band communication using a frequency in a different band from the frequency used to share power has been considered. In this case, among a plurality of electronic devices, including an electronic device and an external electronic device, that have a communication function, the electronic device and the external electronic device may require a protocol which enables the electronic device and the external electronic device to recognize each other in order to establish an out-band communication connection.

Various embodiments disclosed herein may provide a wireless charging method and an electronic device supporting the same, in which a communication scheme may be switched based on mutual recognition between the electronic device and an external electronic device during a wireless charging operation.

An electronic device according to an embodiment may include a power reception coil, a first communication circuit configured to support first communication in a first frequency band, a second communication circuit configured to support second communication in a second frequency band different from the first frequency band, and a control circuit electrically connected to the power reception coil, the first communication circuit, and the second communication circuit.

According to various embodiments, the control circuit may be configured to connect to an external electronic device via the first communication based on the first communication circuit, receive a first signal including a first designated identification information from the external electronic device by using the first communication, detect a second signal of the external electronic device, the second signal broadcasting a second designated identification information, by using the second communication based on the second communication circuit, when it is determined that the first identification information included in the first signal and the second identification information broadcasted by the second signal correspond to each other, transmit, to the external electronic device, a third signal for requesting connection of the second communication with the external electronic device, by using the first communication, connect to the external electronic device via the second communication, based on a response of the external electronic device to the request, and transmit or receive data, which is used to receive power from the external electronic device based on the power reception coil, to or from the external electronic device, by using the second communication.

According to an embodiment, the control circuit may be configured to connect to an external electronic device via the first communication based on the first communication circuit, transmit a first signal including designated identification information to the external electronic device by using the first communication, transmit a second signal broadcasting the designated identification information, by using the second communication based on the second communication circuit, receive a third signal for requesting connection of the second communication with the electronic device from the external electronic device having detected the second signal, by using the first communication, connect to the external electronic device via the second communication, in response to the request, and transmit or receive data, which is used to receive power from the external electronic device based on the power reception coil, to or from the external electronic device, by using the second communication.

A wireless charging method of an electronic device according to an embodiment may include, based on a first communication circuit configured to support first communication in a first frequency band, connecting to an external electronic device via the first communication, receiving a first signal including a first designated identification information from the external electronic device by using the first communication, based on a second communication circuit configured to support second communication in a second frequency band different from the first frequency band, detecting a second signal of the external electronic device, the second signal broadcasting a second designated identification information, by using the second communication, and determining whether the first identification information included in the first signal and the second identification information broadcasted by the second signal correspond to each other.

According to an embodiment, the determining on corresponding of the information may include determining that the first identification information included in the first signal and the second identification information broadcasted by the second signal correspond to each other, transmitting, to the external electronic device, a third signal for requesting connection of the second communication with the external electronic device, by using the first communication, connecting to the external electronic device via the second communication, based on a response of the external electronic device to the request, and transmitting or receiving data, which is used to receive power from the external electronic device based on a power reception coil, to or from the external electronic device by using the second communication.

According to various embodiments, a protocol which enables an electronic device and an external electronic device, which share power, to recognize each other in order to switch a communication scheme during a wireless charging operation may be provided.

According to various embodiments, the reliability of wireless charging may be improved via switching to a communication scheme which does not interfere with a power signal.

In addition, various effects identified directly or indirectly through this disclosure may be provided.

BRIEF DESCRIPTION OF DRAWINGS

In relation to the description of the drawings, the same reference numerals may be assigned to the same or corresponding components.

DETAILED DESCRIPTION

Hereinafter, various embodiments of the present disclosure are disclosed with reference to the accompanying drawings. However, the present disclosure is not intended to be limited by the various embodiments of the present disclosure to a specific embodiment and it is intended that the present disclosure covers all modifications, equivalents, and/or alternatives of the present disclosure provided they come within the scope of the appended claims and their equivalents.

Figure 1:
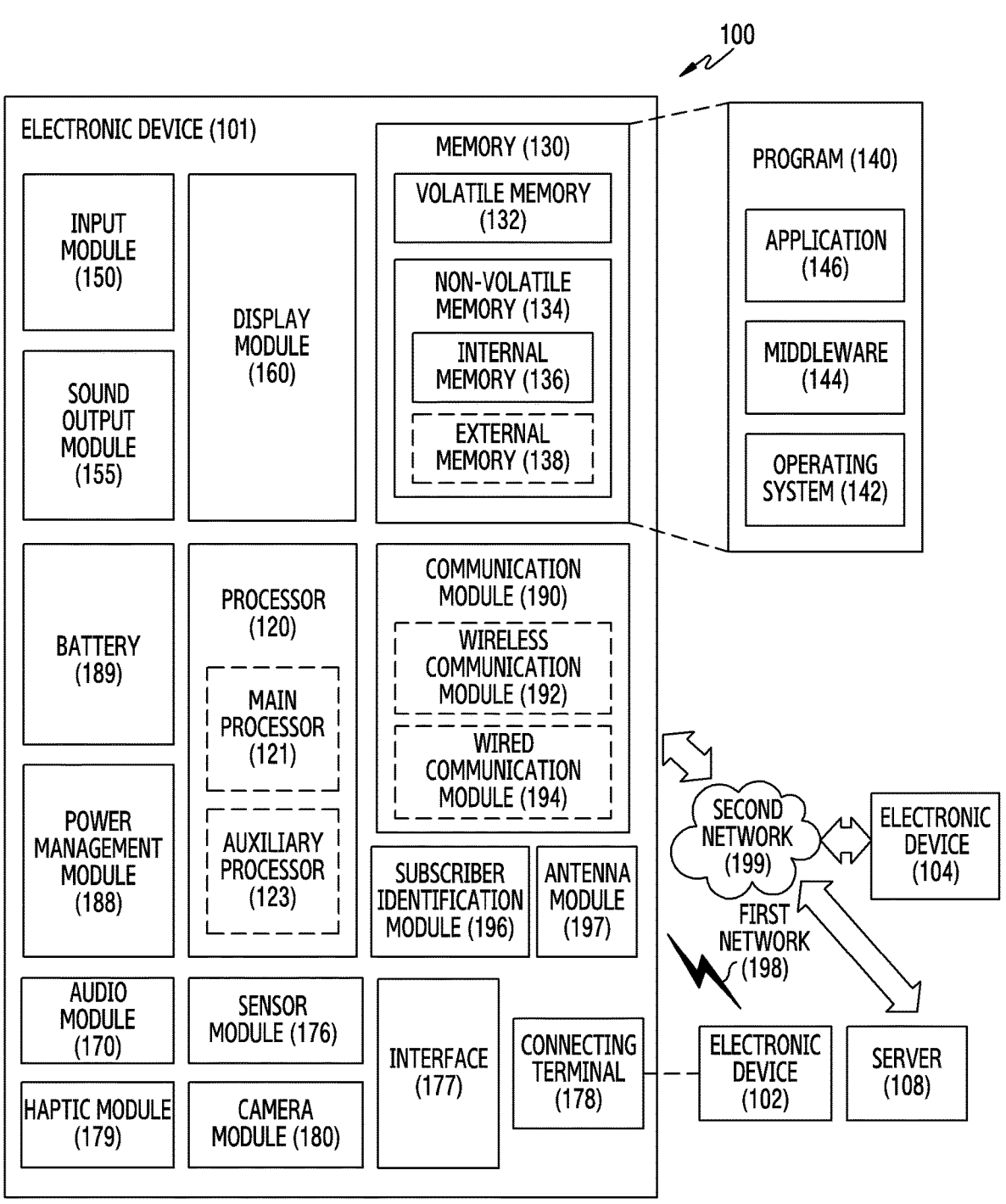
FIG. 1 is a diagram illustrating an electronic device in a network environment according to an embodiment.

FIG. 1 is a diagram illustrating an electronic device in a network environment according to an embodiment.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semisupervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
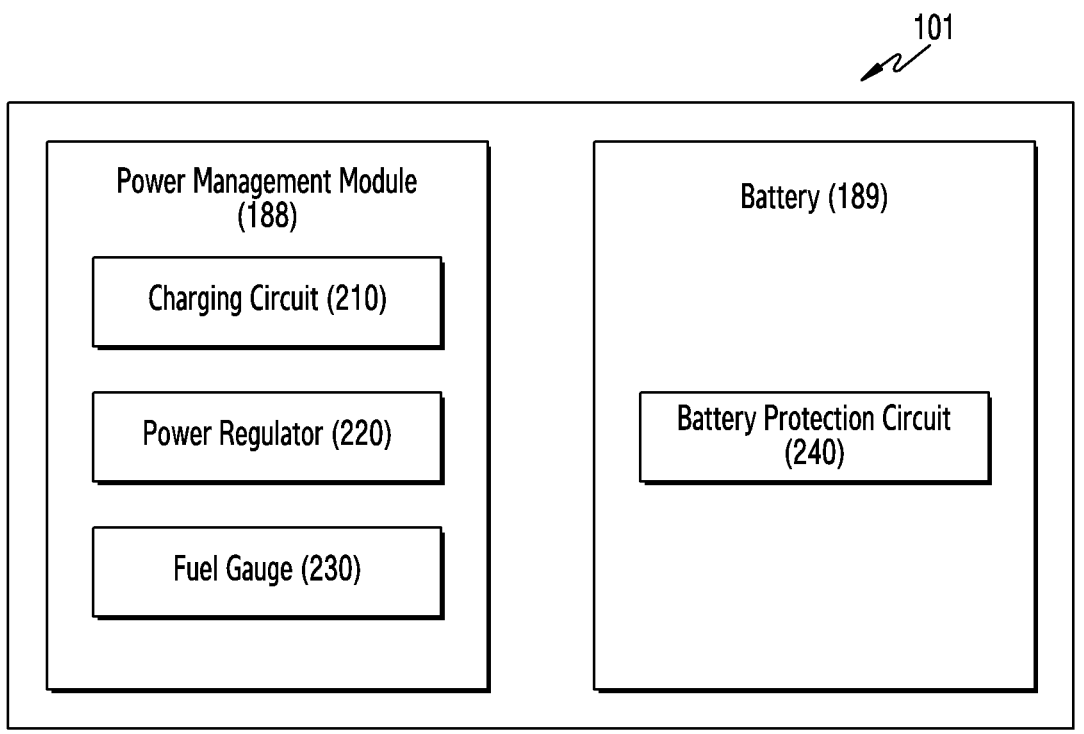
FIG. 2 is a diagram illustrating a power management module and a battery of an electronic device according to an embodiment.

FIG. 2 is a diagram illustrating a power management module and a battery of an electronic device according to an embodiment.

Referring to FIG. 2, the power management module 188 may include a charging circuitry 210, a power regulator 220, or a fuel gauge 230.

The charging circuitry 210 may charge the battery 189 by using power supplied from an external power source outside the electronic device 101. According to an embodiment, the charging circuitry 210 may select a charging scheme (e.g., normal charging or quick charging) based at least in part on a type of the external power source (e.g., a power outlet, a USB, or wireless charging), magnitude of power suppliable from the external power source (e.g., about Watt or more), or an attribute of the battery 189, and may charge the battery 189 using the selected charging scheme. The external power source may be connected with the electronic device 101, for example, directly via the connecting terminal 178 or wirelessly via the antenna module 197.

The power regulator 220 may generate a plurality of powers having different voltage levels or different current levels by adjusting a voltage level or a current level of the power supplied from the external power source or the battery 189. The power regulator 220 may adjust the voltage level or the current level of the power supplied from the external power source or the battery 189 into a different voltage level or current level that is appropriate for each of some of the components included in the electronic device 101. According to an embodiment, the power regulator 220 may be implemented in the form of a low drop out (LDO) regulator or a switching regulator.

The fuel gauge 230 may measure use state information about the battery 189 (e.g., a capacity, number of times of charging or discharging, a voltage, or a temperature of the battery 189).

The power management module 188 may determine, by using the charging circuitry 210, the power regulator 220, or the fuel gauge 230, charging state information (e.g., lifetime, over voltage, low voltage, over current, over charge, over discharge, overheat, short, or swelling) related to the charging of the battery 189 based at least in part on the measured use state information about the battery 189. The power management module 188 may determine whether the state of the battery 189 is normal or abnormal based at least in part on the determined charging state information. If the state of the battery 189 is determined to abnormal, the power management module 188 may adjust the charging of the battery 189 (e.g., reduce the charging current or voltage, or stop the charging). According to an embodiment, at least some of the functions of the power management module 188 may be performed by an external control device (e.g., the processor 120).

According to an embodiment, the battery 189 may include a battery protection circuit (e.g., protection circuit module (PCM)) 240. The PCM 240 may perform one or more of various functions (e.g., a pre-cutoff function) to prevent a performance deterioration of, or a damage to, the battery 189. The PCM 240, additionally or alternatively, may be configured as at least part of a battery management system (BMS) capable of performing various functions including, but not limited to, cell balancing, measurement of battery capacity, count of a number of charging or discharging, measurement of temperature, or measurement of voltage.

According to an embodiment, at least part of the charging state information or use state information regarding the battery 189 may be measured using a corresponding sensor (e.g., a temperature sensor) of the sensor module 176, the fuel gauge 230, or the power management module 188. According to an embodiment, the corresponding sensor (e.g., a temperature sensor) of the sensor module 176 may be included as part of the PCM 240, or may be placed adjacent to the battery 189 as a separate device.

Hereinafter, a first electronic device or a second electronic device explained with reference to the drawings may correspond to an electronic device of FIG. 1 described above (e.g., the electronic device 101). In an embodiment, the first electronic device may include at least one of a Tx function for wirelessly transmitting power to an adjacent (or contacted) second electronic device (e.g., a power reception device) to charge the second electronic device, and an Rx function for wirelessly receiving power from a second electronic device (e.g., a power transmission device) to charge a mounted battery. Similarly, the second electronic device may include at least one of a Tx function for wirelessly transmitting power to an adjacent (or contacted) first electronic device (e.g., a power reception device), and an Rx function for wirelessly receiving power from a first electronic device (e.g., a power transmission device). According to an embodiment, a function or an operation of the first electronic device described below may be equivalently performed by the second electronic device, and a function or an operation of the second electronic device may also be equivalently performed by the first electronic device.

Figure 3:
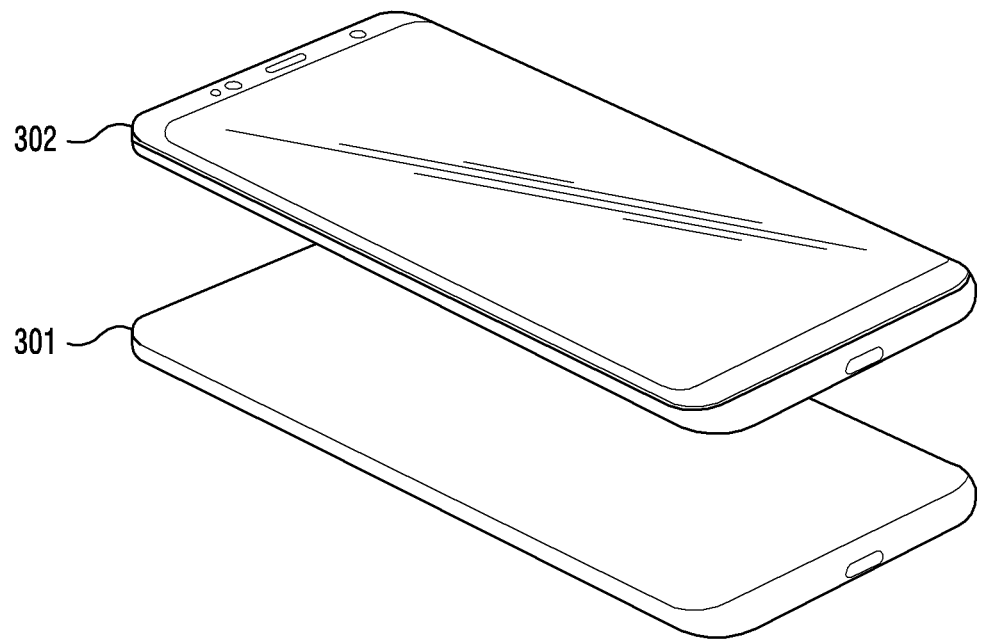
FIG. 3 is a perspective view illustrating a wireless charging environment between a first electronic device and a second electronic device according to an embodiment.

FIG. 3 is a perspective view illustrating a wireless charging environment between a first electronic device and a second electronic device according to an embodiment.

Referring to FIG. 3, a first electronic device 301 (e.g., a power transmission device) according to an embodiment may wirelessly transmit power to charge an adjacent (or contacted) second electronic device 302 (e.g., a power reception device) within a specified distance. For example, when a battery of the second electronic device 302 is not fully charged or when the available power amount of the battery is less than a specified level, the first electronic device 301 may wirelessly transmit power to charge the battery of the second electronic device 302.

According to an embodiment, at a time point prior to transmitting power wirelessly, for example, in a state of waiting for wireless charging, the first electronic device 301 may determine proximity (or contact) of the second electronic device 302 to the first electronic device 301. For example, the first electronic device 301 may transmit a signal (e.g., a ping signal) to determine proximity (or contact) of the second electronic device 302 or to determine whether a signal or data transmitted from the first electronic device 301 can reach the second electronic device 302. In an embodiment, the first electronic device 301 may receive a signal (e.g., an ACK signal) in response to the transmitted signal from an adjacent (or contacted) second electronic device 302, and determine that the second electronic device 302 is in contact with the first electronic device or is adjacent to the first electronic device within a specified distance, based on the signal reception.

According to an embodiment, the first electronic device 301 and the second electronic device 302 may be the same type of devices. For example, the first electronic device 301 and the second electronic device 302 may include a mobile device (e.g., a smartphone). According to another embodiment, the first electronic device 301 and the second electronic device 302 may be different types of devices which are at least partially different from each other. For example, one of the first electronic device 301 and the second electronic device 302 may include a wireless charging device (e.g., a wireless charging pad), and the other electronic device may include a mobile device (e.g., a smartphone, a wearable device, or a sound output device (a wireless earphone)).

Figure 4:
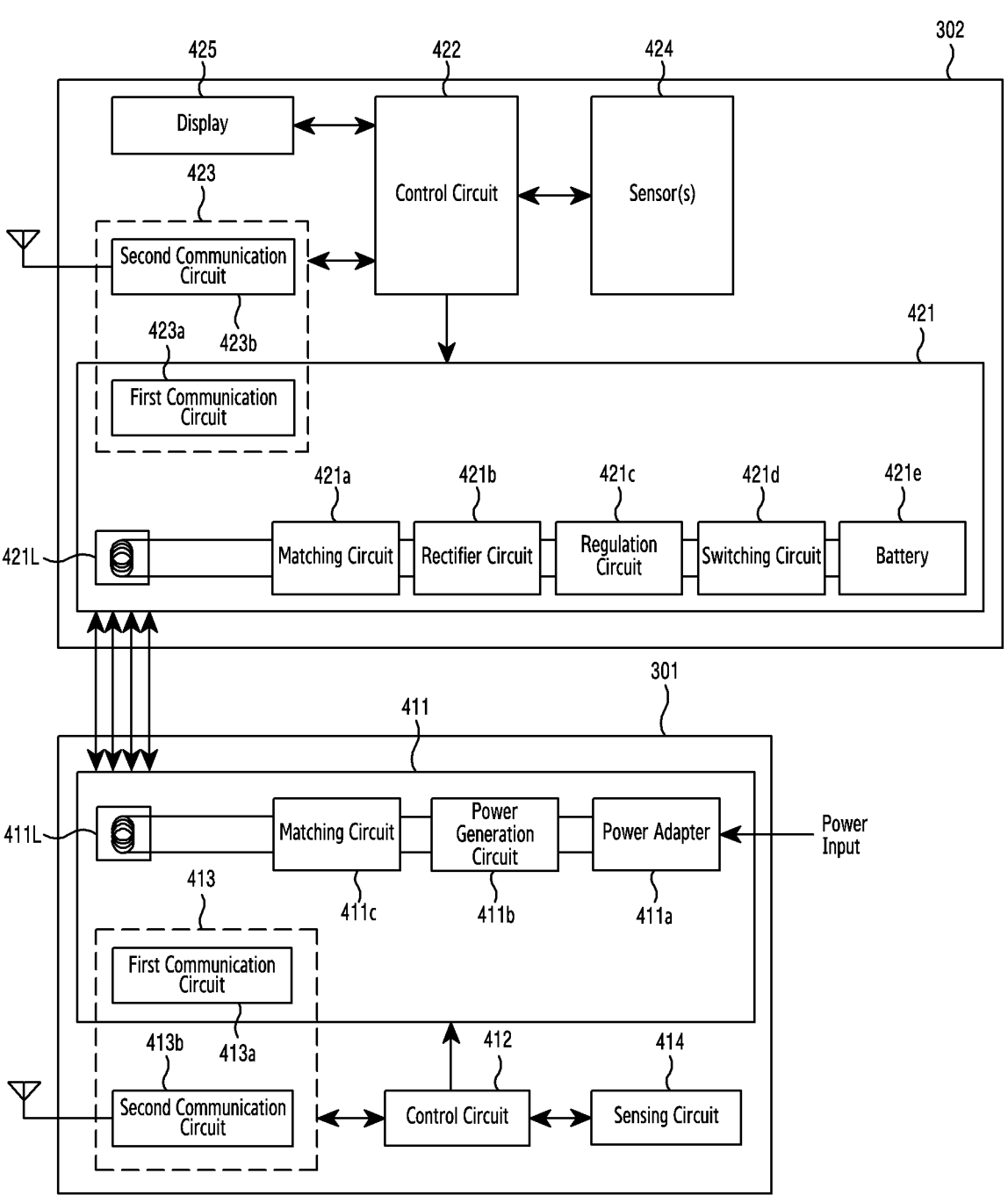
FIG. 4 is a diagram illustrating some components of a first electronic device and a second electronic device according to an embodiment.

FIG. 4 is a diagram illustrating some components of a first electronic device and a second electronic device according to an embodiment.

Referring to FIG. 4, the first electronic device 301 may operate a power transmission function (e.g., a Tx function) to wirelessly transmit power to the second electronic device 302 which is in contact with the first electronic device 301 or adjacent to the first electronic device 301 within a specified distance. In this regard, the first electronic device 301 may include at least one of a power transmission circuit 411 which supports the power transmission function, a control circuit 412, a communication circuit 413, and a sensing circuit 414.

The power transmission circuit 411 may receive power from an external power source (e.g., a wall power source, an auxiliary battery device, a laptop computer, a desktop computer, or a smartphone). The power transmission circuit 411 may include a power adapter 411a which converts a voltage of the input power, a power generation circuit 411b which generates power, a power transmission coil 411L which transmits power, and a matching circuit 411c capable of improving the efficiency between the power transmission coil 411L and a power reception coil 421L of the second electronic device 302. According to various embodiments, the power transmission circuit 411 may include a plurality of at least one of the power adapter 411a, the power generation circuit 411b, the power transmission coil 411L, and the matching circuit 411c in order to wirelessly transmit power to a plurality of second electronic devices.

The control circuit 412 may perform an overall control related to power transmission of the first electronic device 301, and may generate various signals or data involved in the power transmission and transmit the generated signals or data to the communication circuit 413. According to an embodiment, the control circuit 412 may, using the communication circuit 413, calculate power (or the amount of power) to be transmitted to the second electronic device 302 based on a signal or data received from the second electronic device 302. The control circuit 412 may control the power transmission circuit 411 so that the calculated power is transmitted to the second electronic device 302 through the power transmission coil 411L.

According to an embodiment, the control circuit 412 may be integrated with a processor (e.g., the processor 120 of FIG. 1) included in the first electronic device 301, and at least some of functions or operations of the control circuit 412 may be performed by the processor 120. According to another embodiment, the control circuit 412 may be configured independently of the processor 120, and some of the functions or operations of the control circuit 412 may be performed by the processor 120 instead. According to yet another embodiment, the control circuit 412 may be configured independently of the processor 120, and the functions or operations of the control circuit 412 may be independently performed by the control circuit 412 regardless of the processor 120.

The communication circuit 413 may include at least one of a first communication circuit 413a and a second communication circuit 413b. According to an embodiment, the first communication circuit 413a may communicate with a first communication circuit 423a of the second electronic device 302 by using a frequency in a band which is the same as a frequency used to wirelessly transmit power in the power transmission coil 411L or is adjacent to the frequency used to wirelessly transmit power. For example, the first communication circuit 413a may support first in-band communication for transmitting a signal or data to the first communication circuit 423a of the second electronic device 302 by using the power transmission coil 411L. According to an embodiment, the second communication circuit 413b may communicate with a second communication circuit 423b of the second electronic device 302 by using a frequency in a frequency band that is different from the frequency band used to wirelessly transmit power in the power transmission coil 411L. For example, the second communication circuit 413b may support second out-band communication for transmitting a signal or data to the second communication circuit 423b of the second electronic device 302 by using an antenna module (e.g., the antenna module 197 of FIG. 1) included in the first electronic device 301. According to various embodiments, the second communication supported by the second communication circuit 413b may include at least one of Bluetooth Low Energy (BLE), Bluetooth, Wi-Fi, and near field communication (NFC).

The sensing circuit 414 may include at least one sensor, and may detect at least one state of the first electronic device 301 by using the at least one sensor. According to an embodiment, the sensing circuit 414 may include at least one of a temperature sensor, a motion sensor, a voltage sensor, and a current sensor. The sensing circuit 414 may detect a temperature state of the first electronic device 301 by using the temperature sensor, detect a movement (or motion) state of the first electronic device 301 by using the motion sensor, or detect an output signal state (e.g., a current magnitude, a voltage magnitude, and/or a power magnitude) of the first electronic device 301 by using the current sensor or the voltage sensor. According to an embodiment, the current sensor or the voltage sensor may measure a signal for the power transmission circuit 411 in order to detect an output signal state of the first electronic device 301. For example, the current sensor or the voltage sensor may measure a signal for at least one of the matching circuit 411c and the power generation circuit 411b. In this regard, the current sensor or the voltage sensor may include a circuit which measures a signal for a front end of the power transmission coil 411L.

According to various embodiments, the first electronic device 301 may further include a display module (e.g., the display module 160 of FIG. 1). The first electronic device 301 may use the display module 160 to output various information related to wireless charging (e.g., notification information relating to proximity (or contact) of the second electronic device 302, information on a charging state of the first electronic device 301, or information on a charging state of the second electronic device 302).

According to an embodiment, the second electronic device 302 may operate a power reception function (e.g., an Rx function) to wirelessly receive power from the first electronic device 301 which is in contact with the second electronic device 302 or is adjacent to the second electronic device 302 within a specified distance. In this regard, the second electronic device 302 may include at least one of a power reception circuit 421 which supports the power reception function, a control circuit 422, a communication circuit 423, at least one sensor 424, and a display 425. Among the components of the second electronic device 302, redundant descriptions of components corresponding to the above-described components of the first electronic device 301 may be omitted.

The power reception circuit 421 may include at least one of the power reception coil 421L which wirelessly receives power from the power transmission coil 411L of the first electronic device 301, a matching circuit 421a capable of improving the efficiency between the power transmission coil 411L and the power reception coil 421L, a rectifier circuit 421b which rectifies a received AC power to a DC, a regulation circuit 421c which regulates a charge voltage, a battery 421e, and a switching circuit 421d which selectively connects the regulation circuit 421c and the battery 421e.

The control circuit 422 may perform an overall control related to power reception of the second electronic device 302. For example, the control circuit 422 may generate various signals or data involved in the power reception and transmit the generated signal or data to the communication circuit 423.

The communication circuit 423 may include at least one of the first communication circuit 423a which performs first in-band communication with the first communication circuit 413a of the first electronic device 301 by using the power reception coil 421L, and the second communication circuit 423b which performs second out-band communication with the second communication circuit 413b of the first electronic device 301 by using an antenna module (e.g., the antenna module 197 of FIG. 1) of the second electronic device 302.

The at least one sensor 424 may include at least one of a temperature sensor, a motion sensor, a voltage sensor, and a current sensor. The at least one sensor 424 may detect at least one state of the second electronic device 302 by using the above-described sensor. The display 425 may visually display various information related to wireless charging of the second electronic device 302.

Figure 5:
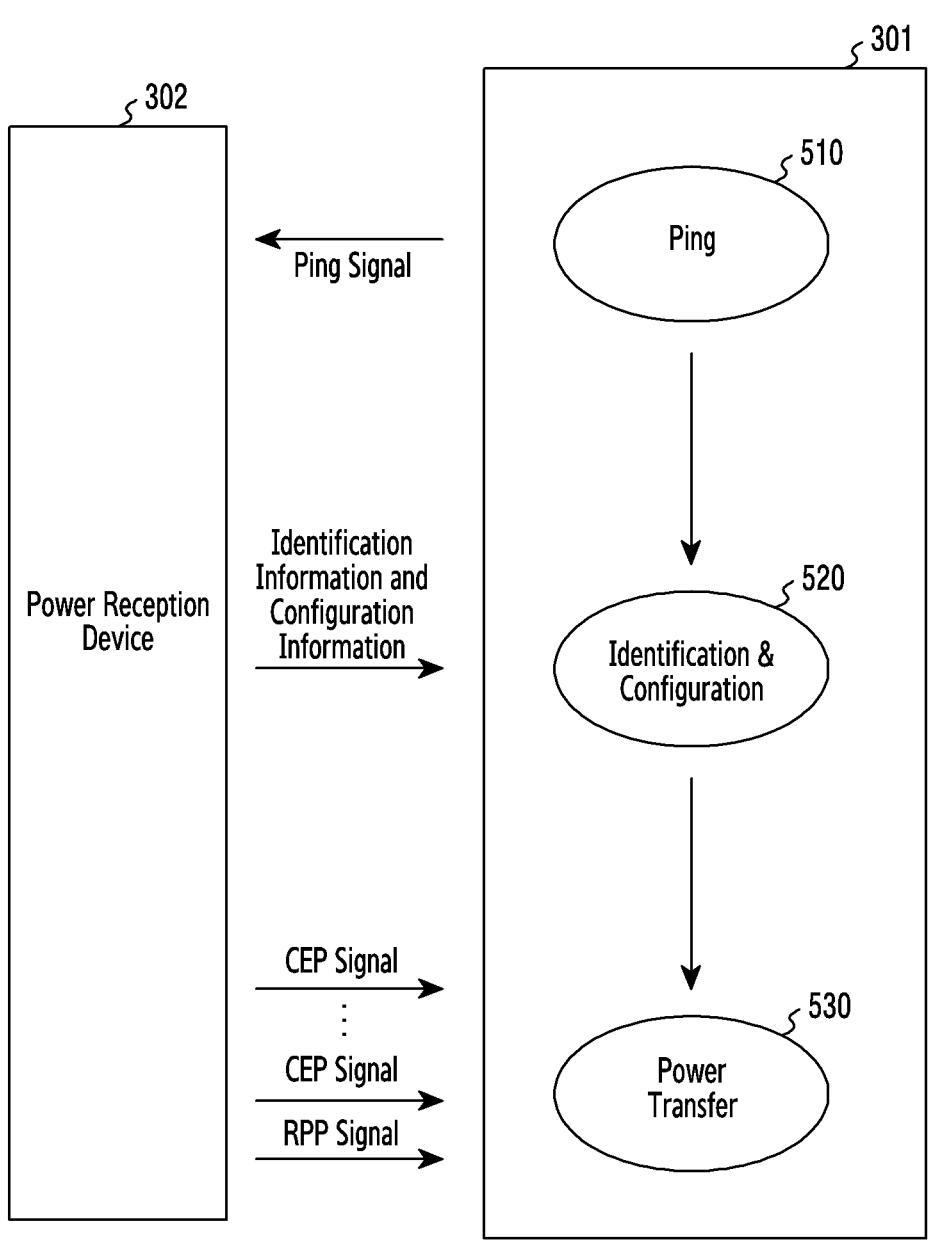
FIG. 5 is a diagram illustrating a wireless charging process between a first electronic device and a second electronic device according to an embodiment.

FIG. 5 is a diagram illustrating a wireless charging process between a first electronic device and a second electronic device according to an embodiment.

Referring to FIG. 5, in an operation of operating a power transmission function (e.g., a Tx function), the first electronic device 301 may sequentially perform a ping operation 510, an identification and configuration operation 520, and a power transmission (power transfer) operation 530. The first electronic device 301 may perform the above operations 510, 520, and 530 to detect and authenticate the second electronic device 302 (e.g., a power reception device) which is in contact with the first electronic device 301 or is adjacent to the first electronic device 301 within a specified distance, and may transmit power wirelessly to the second electronic device 302.

In an embodiment, a control circuit (e.g., the control circuit 412 of FIG. 4) of the first electronic device 301 may perform the ping operation 510 while waiting (or preparing) for wireless charging. For example, the control circuit 412 may perform the ping operation 510 of transmitting a ping signal in a digital or analog form in order to detect a target of the wireless charging. According to an embodiment, the control circuit 412 may receive an acknowledgement (ACK) signal responding to the ping signal from the second electronic device 302. The control circuit 412 may recognize the presence of the second electronic device 302 (e.g., contact of the second electronic device 302 to the first electronic device 301 or proximity of the second electronic device to the first electronic device 301 within a specified distance), based on the reception of the ACK signal.

According to various embodiments, in the ping operation 510, the control circuit 412 of the first electronic device 301 may determine at least one parameter related to transmission of the ping signal. For example, the control circuit 412 may determine at least one parameter related to at least one of a frequency of a ping signal, a voltage applied to a power transmission circuit (e.g., the power transmission circuit 411 of FIG. 4) to transmit the ping signal, and a transmission period of the ping signal. In various embodiments, the at least one parameter may be configured to be a default value in an initial configuration operation of a wireless charging system of the first electronic device 301.

In an embodiment, as the presence of the second electronic device 302 is recognized based on the reception of the ACK signal, in the identification and configuration operation 520, the control circuit 412 of the first electronic device 301 may establish a first in-band communication connection with the second electronic device 302, based on a first communication circuit (e.g., the first communication circuit 413a of FIG. 4). The control circuit 412 may receive at least one signal or data from the second electronic device 302 by using the first communication. For example, the control circuit 412 may receive, from the second electronic device 302, a signal or data including information (e.g., a wireless communication ID of the second electronic device 302) capable of authenticating the second electronic device 302. When the information capable of authenticating the second electronic device 302 corresponds to information pre-recorded in a memory (e.g., the memory 130 of FIG. 1) of the first electronic device 301 (e.g., a wireless communication ID of at least one external electronic device authenticated to share power with the first electronic device 301), the control circuit 412 may determine the second electronic device 302 recognized in the ping operation 510 as a valid device for wireless charging. Alternatively, the control circuit 412 may receive a signal or data including various types of information required by the second electronic device 302 to wirelessly receive power from the first electronic device 301, by using the first communication.

In an embodiment, as the second electronic device 302 is authenticated based on at least one signal or data received from the second electronic device 302, the control circuit 412 of the first electronic device 301 may wirelessly transmit power to the second electronic device 302 in the power transfer operation 530. According to an embodiment, while wirelessly transmitting power to the second electronic device 302, the control circuit 412 may receive at least one signal or data from the second electronic device 302 by using the first communication. For example, the control circuit 412 may receive the signal or data including at least one of a control error packet (CEP) indicating notification information on power (or the amount of power) required for charging by the second electronic device 302, and a received power packet (RPP) indicating size information of power (or the amount of power) received by the second electronic device 302. In an embodiment, the control circuit 412 may adjust power wirelessly transmitted to the second electronic device 302, based on at least one of the CEP and the RPP.

Figure 6:
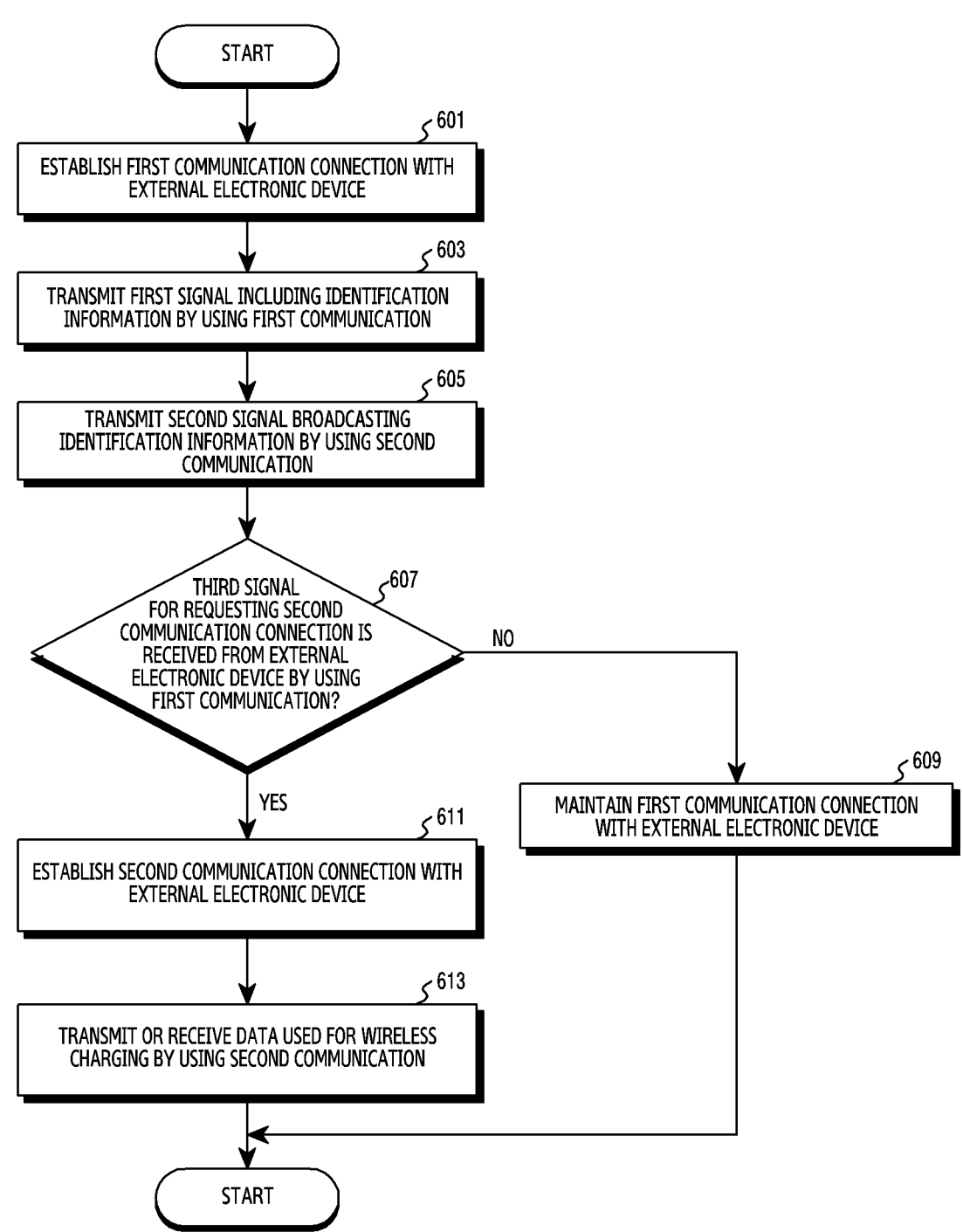
FIG. 6 is a flowchart illustrating a wireless charging method of a first electronic device according to an embodiment.

FIG. 6 is a flowchart illustrating a wireless charging method of a first electronic device according to an embodiment.

Referring to FIG. 6, in operation 601, a first electronic device (e.g., a power transmission device or the first electronic device 301 of FIG. 3, 4, or 5) may establish a first communication connection with an external electronic device (e.g., a power reception device or the second electronic device 302 of FIG. 3, 4, or 5). For example, a control circuit (e.g., the control circuit 412 of FIG. 4) of the first electronic device 301 may control a first communication circuit (e.g., the first communication circuit 413a of FIG. 4) to connect to the second electronic device 302 via first communication in an authentication and configuration operation (e.g., the identification and configuration operation 520 of FIG. 5) of configuring a wireless charging process with an external electronic device (hereinafter, referred to as the second electronic device 302) recognized based on a ping operation (e.g., the ping operation 510 of FIG. 5). According to an embodiment, the first communication may include in-band communication using a frequency in a band which is the same as or similar to a band used to wirelessly transmit power in a power transmission coil (e.g., the power transmission coil 411L of FIG. 4) of the first electronic device 301.

After the identification and configuration operation 520, operations described below may be performed in a power transmission operation (e.g., the power transfer operation 530 of FIG. 5) in which the first electronic device 301 wirelessly transmits power to the second electronic device 302.

In operation 603, the control circuit 412 of the first electronic device 301 may transmit a first signal including designated identification information to the second electronic device 302 by using the first communication. According to an embodiment, the designated identification information may be used to establish a second communication (e.g., communication having a protocol different from that of the first communication) connection with the second electronic device 302, and may include a communication ID, an identification key, or a code at least temporarily generated by the control circuit 412. However, the disclosure is not limited thereto, and the designated identification information may include various types of information which may be uniquely defined by the control circuit 412.

In an embodiment, when the presence of the second electronic device 302 (e.g., contact of the second electronic device 302 to the first electronic device 301 or proximity of the second electronic device to the first electronic device within a specified distance) is recognized by the ping operation 510, the control circuit 412 may generate the identification information and record the identification information in a memory (e.g., the memory 130 of FIG. 1). For example, the identification information may be generated to be valid (or maintained) during a specified time, and may be removed from the memory 130 by the control circuit 412 at a time point when the specified time period has elpased.

In operation 605, the control circuit 412 of the first electronic device 301 may transmit a second signal which broadcasts the designated identification information, by using second communication. According to an embodiment, the second communication may include out-band communication using a frequency in a different band from the frequency used to wirelessly transmit power in the power transmission coil 411L of the first electronic device 301. In an embodiment, the control circuit 412 may control a second communication circuit (e.g., the second communication circuit 413b of FIG. 4) to activate the second communication including at least one of Bluetooth low energy, Bluetooth, Wi-Fi, and near field communication. The control circuit 412 may transmit a second signal which broadcasts (or includes) designated identification information, according to a specified period, by using the second communication.

In operation 607, the control circuit 412 of the first electronic device 301 may determine whether a third signal is received from the second electronic device 302. For example, the control circuit 412 may determine whether the third signal for requesting a second communication connection with the first electronic device 301 is received, via the first communication for which the connection with the second electronic device 302 is established. In this regard, the third signal may be or may not be transmitted from the second electronic device 302 according to whether a specified condition is satisfied in the second electronic device 302. For example, the second electronic device 302 may detect the second signal transmitted from the first electronic device 301 in operation 605, and when it is determined that the identification information in the first signal received from the first electronic device 301 in operation 603 and the identification information broadcasted (or included) by the detected second signal correspond (or match) to each other, the third signal may be transmitted from the second electronic device 302 to the first electronic device 301.

According to an embodiment, when the control circuit 412 of the first electronic device 301 does not receive the third signal from the second electronic device 302 via the first communication in operation 607, in operation 609, the control circuit 412 may maintain the first communication connection established with the second electronic device 302. The control circuit 412 may transmit or receive at least one signal or data used for wireless charging to or from the second electronic device 302 via the first communication in which the connection is maintained.

According to another embodiment, when the control circuit 412 of the first electronic device 301 receives the third signal from the second electronic device 302 via the first communication in operation 607, the control circuit 412 may establish a second communication connection with the second electronic device 302 in operation 611. In addition, in operation 613, the control circuit 412 may transmit or receive at least one signal or data used for wireless charging to or from the second electronic device 302 through the connected second communication.

In various embodiments, when the second communication connection with the second electronic device 302 is established, the control circuit 412 of the first electronic device 301 may at least temporarily deactivate operation of the first communication. In this operation, the control circuit 412 may maintain the first communication connection established with the second electronic device 302. According to various embodiments, at least one signal or data transmitted or received via the first communication or the second communication may include at least one of a CEP and an RPP transmitted from the second electronic device 302 to the first electronic device 301, and may also include various types of information used for wireless charging between the first electronic device 301 and the second electronic device 302.

According to various embodiments, the above-described embodiment of FIG. 6 may be equivalently or similarly applied to a wireless charging method of the second electronic device 302. For example, in operation 601, a control circuit (e.g., the control circuit 422 of FIG. 4) of the second electronic device 302 may control a first communication circuit (e.g., the first communication circuit 423a of FIG. 4) to connect to the first electronic device 301 via first in-band communication using a frequency in a band which is the same as or similar to a band used to wirelessly receive power in a power reception coil (e.g., the power reception coil 421L of FIG. 4). In operation 603, the control circuit 422 of the second electronic device 302 may transmit a first signal including designated identification information (e.g., a communication ID, an identification key, or a code) to the first electronic device 301 by using the first communication. In operation 605, the control circuit 422 of the second electronic device 302 may control a second communication circuit (e.g., the second communication circuit 423b of FIG. 4) to transmit a second signal which broadcasts the designated identification information, based on second out-band communication using a frequency in a different band from the band used in the power reception coil 421L. In operation 607, the control circuit 422 of the second electronic device 302 may determine whether a third signal for requesting a second communication connection with the second electronic device 302 is received from the first electronic device 301 via the first communication. In this regard, when the identification information in the first signal received from the second electronic device 302 and the identification information broadcasted (or included) by the second signal transmitted from the second electronic device 302 correspond (or match) to each other, the first electronic device 301 may transmit the third signal to the second electronic device 302 by using the first communication. In an embodiment, when it is determined that the third signal is received from the first electronic device 301, in operations 611 and 613, the control circuit 422 of the second electronic device 302 may establish the second communication connection with the first electronic device 301, and may transmit or receive at least one signal or data used for wireless charging to or from the first electronic device 301 via the second communication.

Figure 7:
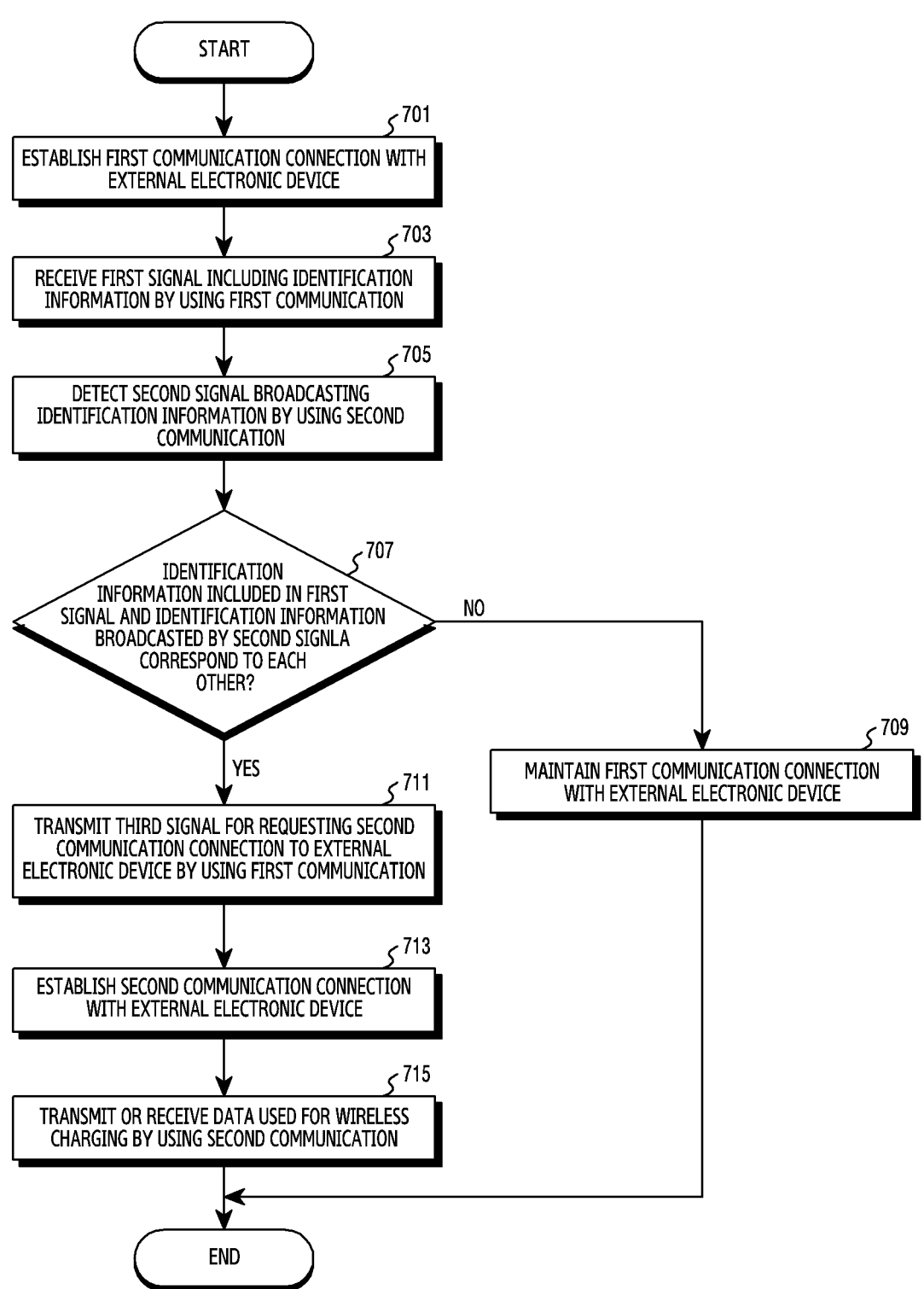
FIG. 7 is a flowchart illustrating a wireless charging method of a second electronic device according to an embodiment.

FIG. 7 is a flowchart illustrating a wireless charging method of a second electronic device according to an embodiment.

Referring to FIG. 7, in operation 701, a second electronic device (e.g., a power reception device or the second electronic device 302 of FIG. 3, 4, or 5) may establish a first communication connection with an external electronic device (e.g., a power transmission device or the first electronic device 301 of FIG. 3, 4, or 5). For example, a control circuit (e.g., the control circuit 422 of FIG. 4) of the second electronic device 302 may control a first communication circuit (e.g., the first communication circuit 423*a* of FIG. 4) to connect to the first electronic device 301 via first communication in an operation of configuring a wireless charging process with an external electronic device (hereinafter, referred to as the first electronic device 301) which is in contact with the second electronic device or adjacent to the second electronic device within a specified distance. According to an embodiment, the first communication may include in-band communication using a frequency in a band which is the same as or similar to a band used to wirelessly receive power in a power reception coil (e.g., the power reception coil 421L of FIG. 4) of the second electronic device 302.

Operations described below may be performed in an operation in which the second electronic device 302 wirelessly receives power from the first electronic device 301.

In operation 703, the control circuit 422 of the second electronic device 302 may receive a first signal including designated identification information from the first electronic device 301 by using the first communication. According to an embodiment, the designated identification information may be used to establish a second communication (e.g., communication having a protocol different from that of the first communication) connection with the first electronic device 301, and may include a communication ID, an identification key, and a code at least temporarily generated by the first electronic device 301, or various other types of information uniquely defined by the first electronic device 301. In an embodiment, the control circuit 422 may at least temporarily record the designated identification information included in the first signal in a memory (e.g., the memory 130 of FIG. 1), in response to the receiving of the first signal. According to various embodiments, the designated identification information may further include designated time information defined by the first electronic device 301. The control circuit 422 may remove the recorded identification information from the memory 130 when the designated time has elapsed from the recording of the designated identification information.

In operation 705, the control circuit 422 of the second electronic device 302 may perform signal scanning using second communication, in response to the receiving of the first signal. For example, the control circuit 422 may control a second communication circuit (e.g., the second communication circuit 423*b* of FIG. 4) to activate second out-band communication using a frequency in a different band from the band used to wirelessly receive power in the power reception coil 421L of the second electronic device 302. The control circuit 422 may perform signal scanning via the activated second communication. According to an embodiment, the activated second communication may include at least one of Bluetooth low energy, Bluetooth, Wi-Fi, and near field communication.

In an embodiment, the control circuit 422 may detect a second signal transmitted from the first electronic device 301 to broadcast designated identification information in an operation of performing signal scanning by using the second communication. In response to the detecting of the second signal based on the signal scanning, the control circuit 422 may obtain the designated identification information broadcasted (or included) by the second signal.

In operation 707, the control circuit 422 of the second electronic device 302 may determine whether the identification information included in the first signal received via the first communication and the identification information broadcasted (or included) by the second signal detected via the second communication correspond (or match) to each other. For example, the control circuit 422 may compare the identification information in the first signal at least temporarily recorded in the memory 130 with the identification information in the second signal obtained based on the signal scanning.

According to an embodiment, when it is determined, in operation 707, that the identification information related to the first signal and the identification information related to the second signal do not correspond (or match) to each other, in operation 709, the control circuit 422 of the second electronic device 302 may maintain the first communication connection established with the first electronic device 301. The control circuit 422 may transmit or receive at least one signal or data used for wireless charging to or from the first electronic device 301 via the first communication in which the connection is maintained.

According to another embodiment, when it is determined in operation 707 that the identification information related to the first signal and the identification information related to the second signal correspond (or match) to each other, in operation 711, the control circuit 422 of the second electronic device 302 may transmit a third signal to the first electronic device 301. For example, the control circuit 422 may transmit the third signal for requesting a second communication connection with the first electronic device 301 by using the first communication for which the connection with the first electronic device 301 is established.

In operations 713 and 715, the control circuit 422 of the second electronic device 302 may establish the second communication connection with the first electronic device 301, and may transmit or receive at least one signal or data used for wireless charging to or from the first electronic device 301 via the second communication. For example, the control circuit 422 may establish the second communication connection with the first electronic device 301, based on an ACK signal of the first electronic device 301 responding to the request according to the third signal. The control circuit 422 may transmit at least one of a CEP and an RPP to the first electronic device 301 via the second communication for which the connection is established. Alternatively, the control circuit 422 may transmit or receive various types of information used in wireless charging between the first electronic device 301 and the second electronic device 302 via the second communication. In various embodiments, when the second communication connection with the first electronic device 301 is established, the control circuit 422 may at least temporarily deactivate operation of the first communication. In this operation, the control circuit 422 may maintain the first communication connection established with the first electronic device 301.

According to various embodiments, the above-described embodiment of FIG. 7 may be equivalently or similarly applied to a wireless charging method of the first electronic device 301. For example, in operation 701, a control circuit (e.g., the control circuit 412 of FIG. 4) of the first electronic device 301 may control a first communication circuit (e.g., the first communication circuit 413*a* of FIG. 4) to connect to the second electronic device 302 via first in-band communication using a frequency in a band which is the same as or similar to a band used to wirelessly transmit power in a power transmission coil (e.g., the power transmission coil 411L of FIG. 4). In operation 703, the control circuit 412 of the first electronic device 301 may receive a first signal including designated identification information (e.g., a communication ID, an identification key, or a code) from the second electronic device 302 by using the first communication. In operation 705, the control circuit 412 of the first electronic device 301 may control a second communication circuit (e.g., the second communication circuit 413b of FIG. 4) to perform signal scanning, based on second out-band communication using a frequency in a different band from the band used in the power transmission coil 411L, so as to detect a second signal transmitted from the second electronic device 302. The second signal broadcasts the designated identification information. In operation 707, the control circuit 412 of the first electronic device 301 may determine whether the identification information in the first signal received from the second electronic device 302 via the first communication and the identification information broadcasted (or included) by the second signal detected via the second communication correspond (or match) to each other. When it is determined that the above-described pieces of identification information correspond to each other, in operation 711, the control circuit 412 of the first electronic device 301 may transmit a third signal for requesting a second communication connection with the second electronic device 302 to the second electronic device 302 by using the first communication. In operations 713 and 715, the control circuit 412 of the first electronic device 301 may establish the second communication connection with the second electronic device 302, based on an ACK signal of the second electronic device 302 responding to the request according to the third signal, and transmit or receive at least one signal or data used for wireless charging to or from the second electronic device 302 via the second communication.

Figure 8:
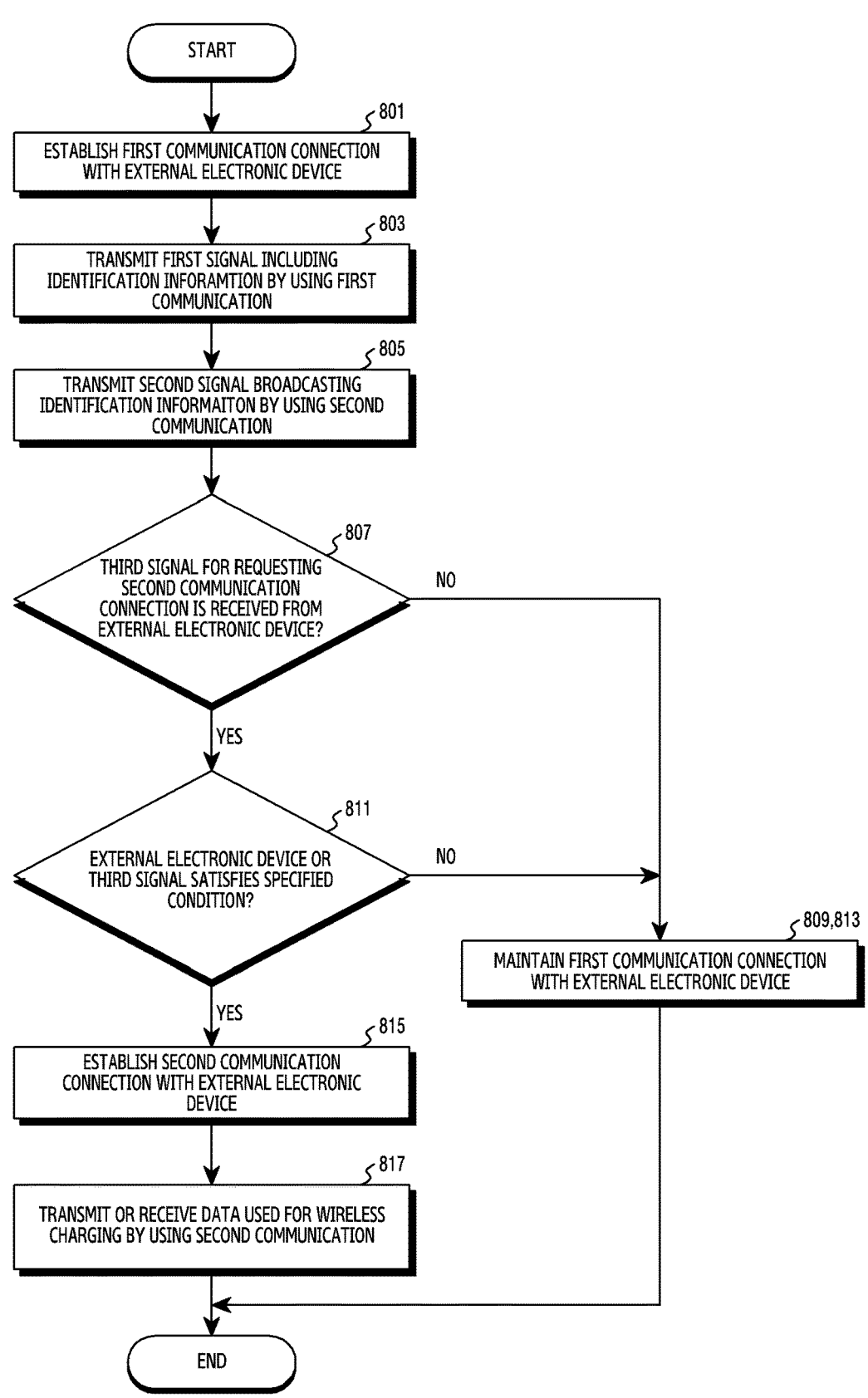
FIG. 8 is a flowchart illustrating a wireless charging method of a first electronic device according to another embodiment.

FIG. 8 is a flowchart illustrating a wireless charging method of a first electronic device according to another embodiment.

Referring to FIG. 8, in operation 801, a first electronic device (e.g., a power transmission device or the first electronic device 301 of FIG. 3, 4, or 5) may establish a first communication connection with an external electronic device (e.g., a power reception device or the second electronic device 302 of FIG. 3, 4, or 5). For example, a control circuit (e.g., the control circuit 412 of FIG. 4) of the first electronic device 301 may control a first communication circuit (e.g., the first communication circuit 413a of FIG. 4) to connect to the second electronic device 302 via first communication in an authentication and configuration operation (e.g., the identification and configuration operation 520 of FIG. 5) of configuring a wireless charging process with an external electronic device (hereinafter, referred to as the second electronic device 302) of which contact with the first electronic device 301 or proximity to the first electronic device within a specified distance is recognized. According to an embodiment, the first communication may include in-band communication using a frequency in a band which is the same as or similar to a band used to wirelessly transmit power in a power transmission coil of the first electronic device 301 (e.g., the power transmission coil 411L of FIG. 4).

After the identification and configuration operation 520, operations described below may be performed in a power transmission operation (e.g., the power transfer operation 530 of FIG. 5) in which the first electronic device 301 wirelessly transmits power to the second electronic device 302.

In operation 803, the control circuit 412 of the first electronic device 301 may transmit a first signal including designated identification information to the second electronic device 302 by using the first communication. According to an embodiment, the designated identification information may be used to establish a second communication (e.g., communication having a protocol different from that of the first communication) connection with the second electronic device 302, and may include a communication ID, an identification key, or a code at least temporarily generated by the control circuit 412. However, the disclosure is not limited thereto, and the designated identification information may include various types of information which may be uniquely defined by the control circuit 412.

In an embodiment, when contact of the second electronic device 302 to the first electronic device 301 or proximity of the second electronic device 302 to the first electronic device 301 within a specified distance is recognized, the control circuit 412 may generate the designated identification information and record the identification information in a memory (e.g., the memory 130 of FIG. 1). According to an embodiment, the control circuit 412 may count the lapse of time from a generation time point (time) of the designated identification information. According to an embodiment, the control circuit 412 may record the second electronic device 302 which shares the designated identification information according to the first signal transmission as a device having priority in establishing a second communication connection with the first electronic device 301.

In operation 805, the control circuit 412 of the first electronic device 301 may transmit a second signal which broadcasts the designated identification information by using second communication. According to an embodiment, the second communication may include out-band communication using a frequency in a different band from the band used to wirelessly transmit power in the power transmission coil 411L of the first electronic device 301. The control circuit 412 may control a second communication circuit (e.g., the second communication circuit 413b of FIG. 4) to activate the second communication including at least one of Bluetooth low energy, Bluetooth, Wi-Fi, and near field communication, and may transmit the second signal which broadcasts (or includes) the designated identification information according to a specified period by using the second communication.

In operation 807, the control circuit 412 of the first electronic device 301 may determine whether a third signal is received from the second electronic device 302. For example, the control circuit 412 may determine whether the third signal for requesting the second communication connection with the first electronic device 301 is received, via the first communication for which the connection with the second electronic device 302 is established. In this regard, when the second electronic device 302 detects the second signal transmitted from the first electronic device 301 in operation 805, and determines that the identification information in the first signal received from the first electronic device 301 in operation 803 and the identification information broadcasted (or included) by the detected second signal correspond (or match) to each other, the third signal may be transmitted from the second electronic device 302.

According to an embodiment, when the control circuit 412 of the first electronic device 301 does not receive the third signal from the second electronic device 302 via the first communication in operation 807, in operation 809, the control circuit 412 may maintain the first communication connection established with the second electronic device 302, and transmit or receive at least one signal or data related to wireless charging to or from the second electronic device 302 by using the first communication.

According to another embodiment, when the control circuit 412 of the first electronic device 301 receives the third signal from the second electronic device 302 via the first communication in operation 807, in operation 811, the control circuit 412 may determine whether the second electronic device 302 or the third signal satisfies a specified condition.

According to an embodiment, the specified condition may include at least one of a first condition in which the third signal is received within a specified time from a time point when the control circuit 412 generates the identification information, a second condition in which the third signal is received via the first communication for which the connection with the second electronic device 302 is established, and a third condition that the second electronic device 302 having transmitted the third signal is a device having priority in establishing the second communication connection with the first electronic device 301. According to various embodiments, the first condition, the second condition, and the third condition may be considered individually or collectively in determining whether a specified condition is satisfied. For example, when one of the first condition, the second condition, and the third condition is satisfied, the control circuit 412 may determine that the specified condition is satisfied. Alternatively, when two or more of the first condition, the second condition, and the third condition are satisfied, the control circuit 412 may determine that the specified condition is satisfied.

According to an embodiment, when it is determined in operation 811 that the specified condition is not satisfied, in operation 813, the control circuit 412 of the first electronic device 301 may maintain the first communication connection established with the second electronic device 302, and transmit or receive at least one signal or data used for wireless charging to or from the second electronic device 302 via the first communication. According to another embodiment, when it is determined in operation 811 that the specified condition is satisfied, in operations 815 and 817, the control circuit 412 may establish the second communication connection with the second electronic device 302, and transmit or receive at least one signal or data used for wireless charging to or from the second electronic device 302 via the second communication.

In various embodiments, when the second communication connection with the second electronic device 302 is established, the control circuit 412 of the first electronic device 301 may at least temporarily deactivate operation of the first communication. In this operation, the control circuit 412 may maintain the first communication connection established with the second electronic device 302. According to various embodiments, at least one signal or data transmitted to or received from the second electronic device 302 via the first communication or the second communication may include at least one of a CEP and an RPP received from the second electronic device 302, and may also include various types of information used for wireless charging between the first electronic device 301 and the second electronic device 302.

According to various embodiments, the above-described embodiment of FIG. 8 may be equivalently or similarly applied to a wireless charging method of the second electronic device 302. For example, in operation 801, a control circuit (e.g., the control circuit 422 of FIG. 4) of the second electronic device 302 may control a first communication circuit (e.g., the first communication circuit 423a of FIG. 4) to connect to the first electronic device 301 via first in-band communication using a frequency in a band which is the same as or similar to a band used to wirelessly receive power in a power reception coil (e.g., the power reception coil 421L of FIG. 4). In operation 803, the control circuit 422 of the second electronic device 302 may transmit a first signal including designated identification information (e.g., a communication ID, an identification key, or a code) to the first electronic device 301 by using the first communication. In operation 805, the control circuit 422 of the second electronic device 302 may control a second communication circuit (e.g., the second communication circuit 423b of FIG. 4) to transmit a second signal which broadcasts the designated identification information, based on second out-band communication using a frequency in a different band from the band used in the power reception coil 421L. In operation 807, the control circuit 422 of the second electronic device 302 may determine whether a third signal for requesting a second communication connection with the second electronic device 302 is received from the first electronic device 301 via the first communication. In this regard, when the identification information in the first signal received from the second electronic device 302 and the identification information broadcasted (or included) by the second signal transmitted from the second electronic device 302 correspond (or match) to each other, the first electronic device 301 may transmit the third signal to the second electronic device 302 by using the first communication. In an embodiment, when it is determined that the third signal is received from the first electronic device 301, in operation 811, the control circuit 422 of the second electronic device 302 may determine whether the first electronic device 301 or the third signal satisfies a specified condition. According to an embodiment, the specified condition may include at least one of a first condition in which the third signal is received within a specified time from a time point when the control circuit 422 generates the identification information, a second condition in which the third signal is received via the first communication for which the connection with the first electronic device 301 is established, and a third condition that the first electronic device 301 having transmitted the third signal is a device having priority in establishing the second communication connection with the second electronic device 302. In an embodiment, when it is determined that at least one of the first condition, the second condition, and the third condition is satisfied, in operations 815 and 817, the control circuit 422 of the second electronic device 302 may establish a second communication connection with the first electronic device 301, and transmit or receive at least one signal or data used for wireless charging to or from the first electronic device 301 by using the second communication.

Figure 9:
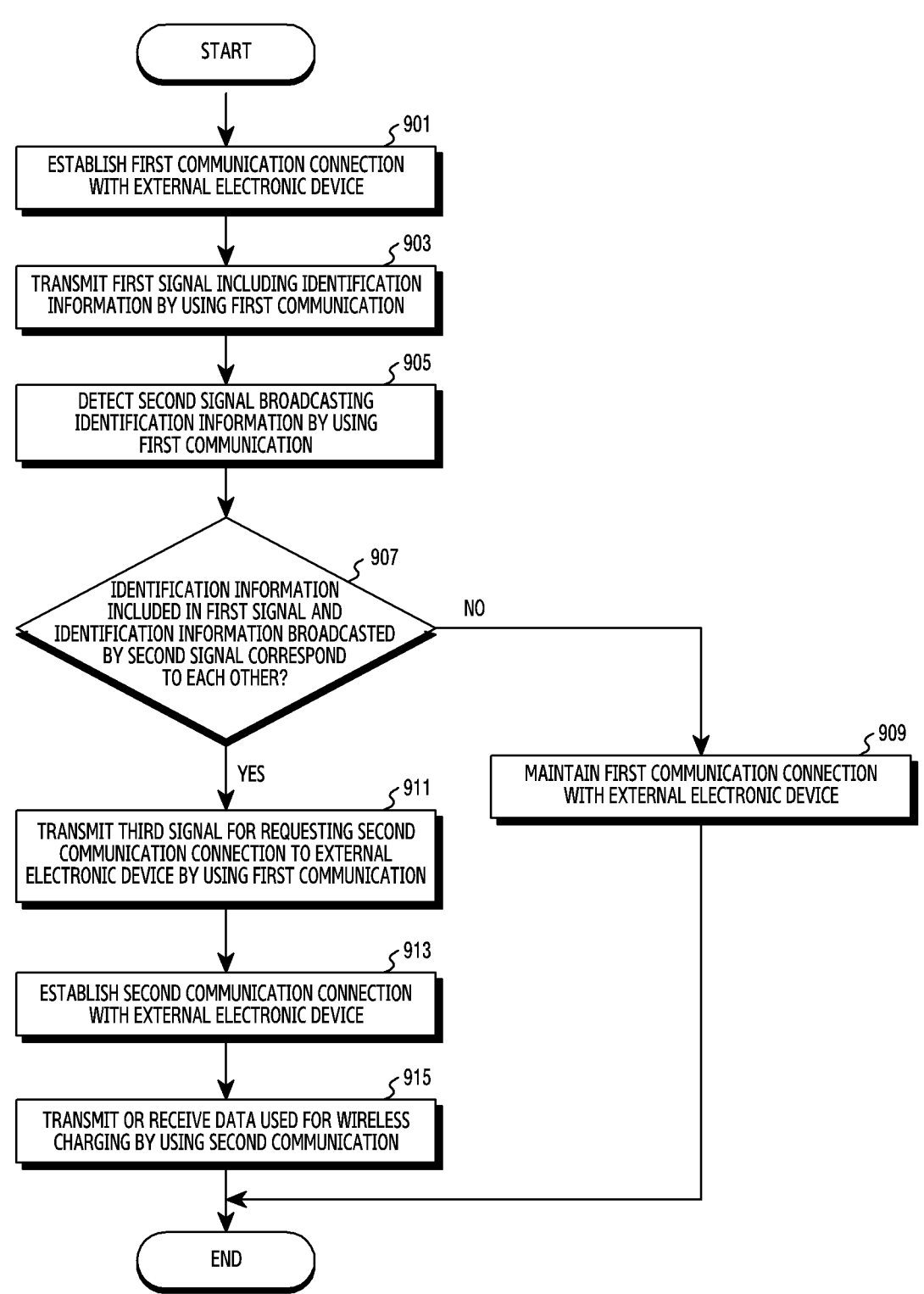
FIG. 9 is a flowchart illustrating a wireless charging method of a second electronic device according to another embodiment.

FIG. 9 is a flowchart illustrating a wireless charging method of a second electronic device according to another embodiment.

Referring to FIG. 9, in operation 901, a second electronic device (e.g., a power reception device or the second electronic device 302 of FIG. 3, 4, or 5) may establish a first communication connection with an external electronic device (e.g., a power transmission device or the first electronic device 301 of FIG. 3, 4, or 5). For example, a control circuit (e.g., the control circuit 422 of FIG. 4) of the second electronic device 302 may control a first communication circuit (e.g., the first communication circuit 423a of FIG. 4) to connect to the first electronic device 301 via first communication in an operation of configuring a wireless charging process with an external electronic device (hereinafter, referred to as the first electronic device 301) which is in contact with the second electronic device or adjacent to the second electronic device within a specified distance. According to an embodiment, the first communication may include in-band communication using a frequency in a band which is the same as or similar to a band used to wirelessly receive power in a power reception coil (e.g., the power reception coil 421L of FIG. 4) of the second electronic device 302.

Operations described below may be performed in an operation in which the second electronic device 302 wirelessly receives power from the first electronic device 301.

In operation 903, the control circuit 422 of the second electronic device 302 may transmit a first signal including designated identification information to the first electronic device 301 by using the first communication. For example, the designated identification information may be used to establish a second communication (e.g., communication having a protocol different from that of the first communication) connection with the first electronic device 301, and may include a communication ID, an identification key, or a code at least temporarily generated by the control circuit 422.

According to an embodiment, the first electronic device 301 may obtain the identification information included in the first signal in response to the receiving of the first signal from the second electronic device 302, and broadcast the obtained identification information. For example, a control circuit (e.g., the control circuit 412 of FIG. 4) of the first electronic device 301 may control a second communication circuit (e.g., the second communication circuit 413b of FIG. 4) to transmit a second signal which broadcasts (or includes) the identification information, based on second out-band communication using a frequency in a different band from a band used to wirelessly transmit power in a power transmission coil (e.g., the power transmission coil 411L of FIG. 4).

In operation 905, the control circuit 422 of the second electronic device 302 may perform signal scanning using second communication, in response to the transmitting of the first signal. For example, the control circuit 422 may control a second communication circuit (e.g., the second communication circuit 423b of FIG. 4) to activate second out-band communication using a frequency in a different band from the band used to wirelessly receive power in the power reception coil 421L of the second electronic device 302. The control circuit 422 may perform signal scanning by using the activated second communication. According to an embodiment, the control circuit 422 may detect the second signal transmitted from the first electronic device 301 to broadcast the identification information, in a signal scanning operation based on the second communication. In response to the detecting of the second signal based on the signal scanning, the control circuit 422 may obtain the identification information broadcasted (or included) by the second signal.

In operation 907, the control circuit 422 of the second electronic device 302 may determine whether the identification information in the first signal transmitted via the first communication and the identification information broadcasted (or included) by the second signal detected via the second communication correspond (or match) to each other. For example, the control circuit 422 may compare identification information at least temporarily generated to transmit the first signal with the identification information in the second signal obtained through the signal scanning based on the second communication.

According to an embodiment, when it is determined in operation 907 that the identification information related to the first signal and the identification information related to the second signal do not correspond (or match) to each other, in operation 909, the control circuit 422 of the second electronic device 302 may maintain the first communication connection established with the first electronic device 301. The control circuit 422 may transmit or receive at least one signal or data related to wireless charging to or from the first electronic device 301 by using the first communication in which the connection is maintained.

According to another embodiment, when it is determined in operation 907 that the identification information related to the first signal and the identification information related to the second signal correspond (or match) to each other, in operation 911, the control circuit 422 of the second electronic device 302 may transmit a third signal to the first electronic device 301. For example, the control circuit 422 may transmit the third signal for requesting the second communication connection with the first electronic device 301 by using the first communication for which the connection with the first electronic device 301 is established.

In operations 913 and 915, the control circuit 422 of the second electronic device 302 may establish the second communication connection with the first electronic device 301, and transmit or receive at least one signal or data used for wireless charging to or from the first electronic device 301 via the second communication. For example, the control circuit 422 may establish the second communication connection with the first electronic device 301, based on an ACK signal of the first electronic device 301 responding to the request according to the third signal. The control circuit 422 may transmit at least one of a CEP and an RPP to the first electronic device 301 via the second communication for which the connection is established. In various embodiments, when the second communication connection with the first electronic device 301 is established, the control circuit 422 may at least temporarily deactivate operation of the first communication while maintaining the first communication connection with the first electronic device 301.

According to various embodiments, the above-described embodiment of FIG. 9 may be equivalently or similarly applied to a wireless charging method of the first electronic device 301. For example, a control circuit (e.g., the control circuit 412 of FIG. 4) of the first electronic device 301 may control a first communication circuit (e.g., the first communication circuit 413a of FIG. 4) to connect to the second electronic device 302 via first in-band communication in operation 901, and may transmit a first signal including designated identification information (e.g., a communication ID, an identification key, or a code) to the second electronic device 302 by using the first communication in operation 903. In operation 905, the control circuit 412 of the first electronic device 301 may control the second communication circuit 413b to perform signal scanning, based on second out-band communication, so as to detect a second signal transmitted from the second electronic device 302. The second signal broadcasts designated identification information. In operation 907, the control circuit 412 of the first electronic device 301 may determine whether the identification information in the first signal transmitted via the first communication and the identification information broadcasted (or included) by the second signal detected via the second communication correspond (or match) to each other. When it is determined that the above-described pieces of identification information correspond to each other, in operation 911, the control circuit 412 of the first electronic device 301 may transmit a third signal for requesting a second communication connection with the second electronic device 302 to the second electronic device 302 by using the first communication. In operations 913 and 915, the control circuit 412 of the first electronic device 301 may establish the second communication connection with the second electronic device 302, based on an ACK signal of the second electronic device 302 responding to the request according to the third signal, and transmit or receive at least one signal or data used for wireless charging to or from the second electronic device 302 via the second communication.

Figure 10:
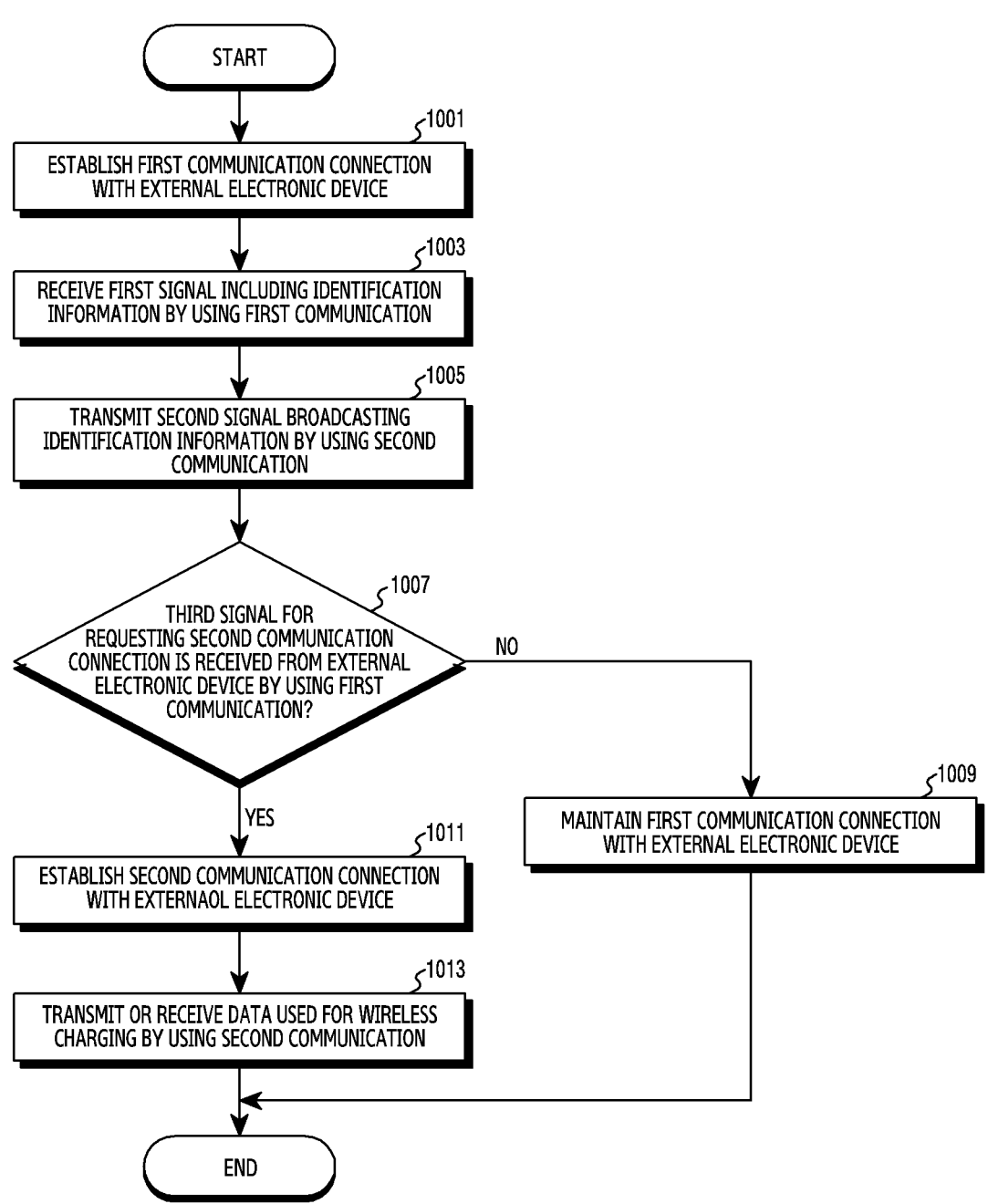
FIG. 10 is a flowchart illustrating a wireless charging method of a second electronic device according to yet another embodiment.

FIG. 10 is a flowchart illustrating a wireless charging method of a second electronic device according to yet another embodiment.

Referring to FIG. 10, in operation 1001, a second electronic device (e.g., a power reception device or the second electronic device 302 of FIG. 3, 4, or 5) may establish a first communication connection with an external electronic device (e.g., a power transmission device or the first electronic device 301 of FIG. 3, 4, or 5). For example, in an operation of configuring a wireless charging process with an external electronic device (hereinafter, referred to as the first electronic device 301), a control circuit (e.g., the control circuit 422 of FIG. 4) of the second electronic device 302 may control a first communication circuit (e.g., the first communication circuit 423a of FIG. 4) to connect to the first electronic device 301 via first in-band communication using a frequency in a band which is the same as or similar to a band used to wirelessly receive power in a power reception coil (e.g., the power reception coil 421L of FIG. 4).

In operation 1003, the control circuit 422 of the second electronic device 302 may receive a first signal including designated identification information from the first electronic device 301 by using the first communication. According to an embodiment, the designated identification information may be used to establish a second communication (e.g., communication having a protocol different from that of the first communication) connection with the first electronic device 301, and may include a communication ID, an identification key, and a code at least temporarily generated by the first electronic device 301, or various types of information uniquely defined by the first electronic device 301. The control circuit 422 may obtain the identification information included in the first signal in response to the receiving of the first signal from the first electronic device 301.

In operation 1005, the control circuit 422 of the second electronic device 302 may transmit a second signal which broadcasts the obtained identification information by using second communication. For example, the control circuit 422 may control a second communication circuit (e.g., the second communication circuit 413b of FIG. 4) to activate second out-band communication using a frequency in a different band from the band used to wirelessly receive power in the power reception coil 421L, and transmit the second signal which broadcasts (or includes) the identification information by using the second communication.

In an embodiment, after transmitting the first signal to the second electronic device 302, the first electronic device 301 may activate the second communication, based on the control of the second communication circuit (e.g., the second communication circuit 413b of FIG. 4). The first electronic device 301 may perform signal scanning by using the activated second communication, so as to detect the second signal transmitted from the second electronic device 302. The second signal broadcasts the identification information. In an embodiment, the first electronic device 301 may determine whether the identification information in the first signal transmitted via the first communication and the identification information broadcasted (or included) by the second signal detected via the second communication correspond (or match) to each other. When it is determined that the above-described pieces of identification information correspond (match) to each other, the first electronic device 301 may transmit a third signal for requesting a second communication connection with the second electronic device 302 to the second electronic device 302 by using the first communication.

In operation 1007, the control circuit 422 of the second electronic device 302 may determine whether the third signal is received from the first electronic device 301. For example, the control circuit 422 may determine whether the third signal for requesting the second communication connection with the second electronic device 302 is received, via the first communication for which the connection with the first electronic device 301 is established.

According to an embodiment, when the second electronic device 302 does not receive the third signal from the first electronic device 301 via the first communication in operation 1007, in operation 1009, the control circuit 422 may maintain the first communication connection with the first electronic device 301. The control circuit 422 may transmit or receive at least one signal or data used for wireless charging to or from the first electronic device 301 via the first communication in which the connection is maintained.

According to another embodiment, when the second electronic device 302 receives the third signal from the first electronic device 301 via the first communication in operation 1007, in operations 1011 and 1013, the control circuit 422 may establish the second communication connection with the first electronic device 301, and may transmit or receive at least one signal or data used for wireless charging to or from the first electronic device 301 via the second communication. In various embodiments, when the second communication connection with the first electronic device 301 is established, the control circuit 422 may at least temporarily deactivate operation of the first communication while maintaining the first communication connection with the first electronic device 301.

According to various embodiments, the above-described embodiment of FIG. 10 may be equivalently or similarly applied to a wireless charging method of the first electronic device 301. For example, in operation 1001, a control circuit (e.g., the control circuit 412 of FIG. 4) of the first electronic device 301 may control a first communication circuit (e.g., the first communication circuit 413a of FIG. 4) to connect to the second electronic device 302 via first in-band communication using a frequency in a band which is the same as or similar to a band used to wirelessly transmit power in a power transmission coil (e.g., the power transmission coil 411L of FIG. 4). In operation 1003, the control circuit 412 of the first electronic device 301 may receive a first signal including designated identification information (e.g., a communication ID, an identification key, or a code) from the second electronic device 302 by using the first communication. In operation 1005, the control circuit 412 of the first electronic device 301 may control a second communication circuit (e.g., the second communication circuit 413b of FIG. 4) to transmit a second signal for broadcasting the identification information obtained from the first signal, based on second out-band communication using a frequency in a different band from the band used in the power transmission coil 411L. In operation 1007, the control circuit 412 of the first electronic device 301 may determine whether a third signal for requesting a second communication connection with the first electronic device 301 is received from the second electronic device 302 via the first communication. According to an embodiment, when the third signal is received from the second electronic device 302 via the first communication, in operations 1011 and 1013, the control circuit 412 of the first electronic device 301 may establish a second communication connection with the second electronic device 302, and may transmit or receive at least one signal or data used for wireless charging to or from the second electronic device 302 via the second communication.

An electronic device according to various embodiments described above may include a power reception coil, a first communication circuit configured to support first communication in a first frequency band, a second communication circuit configured to support second communication in a second frequency band different from the first frequency band, and a control circuit electrically connected to the power reception coil, the first communication circuit, and the second communication circuit.

According to various embodiments, the control circuit may be configured to connect to an external electronic device via the first communication based on the first communication circuit, receive a first signal including a first designated identification information from the external electronic device by using the first communication, detect a second signal of the external electronic device, the second signal broadcasting a second designated identification information, by using the second communication based on the second communication circuit, when it is determined that the first identification information included in the first signal and the second identification information broadcasted by the second signal correspond to each other, transmit, to the external electronic device, a third signal for requesting connection of the second communication with the external electronic device, by using the first communication, connect to the external electronic device via the second communication, based on a response of the external electronic device to the request, and transmit or receive data, which is used to receive power from the external electronic device based on the power reception coil, to or from the external electronic device, by using the second communication.

According to various embodiments, the first frequency band may include a frequency used in the power reception coil to wirelessly receive power from the external electronic device, and the first communication may include a communication scheme using a frequency the same as the frequency used in the power reception coil, or a frequency adjacent to the frequency used in the power reception coil within the first frequency band.

According to various embodiments, the first designated identification information may include unique information at least temporarily generated by the external electronic device.

According to various embodiments, the first designated identification information may include designated time information, and the control circuit may be configured to record the designated identification information in the electronic device in response to the receiving of the first signal, and remove the recording of the designated identification information when a period of time corresponding to the designated time information has elapsed from the recording of the designated identification information.

According to various embodiments, the second communication may include at least one of Bluetooth low energy, Bluetooth, Wi-Fi, and near field communication (NFC).

According to various embodiments, the control circuit may be configured to maintain connection of the first communication with the external electronic device when it is determined that the first identification information included in the first signal and the second identification information broadcasted by the second signal do not correspond to each other.

According to various embodiments, the control circuit may be configured to transmit at least one of a control error packet (CEP) and a received power packet (RPP), as at least a part of the data used to receive power from the external electronic device, by using the second communication.

An electronic device according to various embodiments described above may include a power reception coil, a first communication circuit configured to support first communication in a first frequency band, a second communication circuit configured to support second communication in a second frequency band different from the first frequency band, and a control circuit electrically connected to the power reception coil, the first communication circuit, and the second communication circuit.

According to various embodiments, the control circuit may be configured to connect to an external electronic device via the first communication based on the first communication circuit, transmit a first signal including designated identification information to the external electronic device by using the first communication, transmit a second signal broadcasting the designated identification information, by using the second communication based on the second communication circuit, receive a third signal for requesting connection of the second communication with the electronic device from the external electronic device having detected the second signal, by using the first communication, connect to the external electronic device via the second communication, in response to the request, and transmit or receive data, which is used to receive power from the external electronic device based on the power reception coil, to or from the external electronic device, by using the second communication.

According to various embodiments, the first frequency band may include a frequency used in the power reception coil to wirelessly receive power from the external electronic device, and the first communication may include a communication scheme using a frequency the same as the frequency used in the power reception coil, or a frequency adjacent to the frequency used in the power reception coil within the first frequency band.

According to various embodiments, the control circuit may be configured to, when it is determined that the external electronic device is in contact with the electronic device or the external electronic device is adjacent to the electronic device within a specified distance, generate and record the designated identification information including unique information.

According to various embodiments, the second communication may include at least one of Bluetooth low energy, Bluetooth, Wi-Fi, and near field communication (NFC).

According to various embodiments, the control circuit may be configured to at least temporarily deactivate operation of the first communication when the second communication connection with the external electronic device is established.

According to various embodiments, the control circuit may be configured to, when it is determined that the external electronic device is in contact with the electronic device or the external electronic device is adjacent to the electronic device within a specified distance, generate the designated identification information, and count a lapse of time from a generation time point (time) of the designated identification information.

According to various embodiments, the control circuit may be configured to determine whether the third signal has been received within a specified time from the generation time point of the designated identification information, in response to the receiving of the third signal, and connect to the external electronic device via the second communication when it is determined that the third signal is received within the specified time.

According to various embodiments, the control circuit may be configured to, in response to the transmitting of the first signal, record the external electronic device as a device having priority in connecting to the electronic device via the second communication.

According to various embodiments, the control circuit may be configured to determine whether the external electronic device is the recorded device having priority, in response to the receiving of the third signal, and connect to the external electronic device via the second communication when it is determined that the external electronic device is the device having priority.

A wireless charging method of an electronic device according to various embodiments described above may include, based on a first communication circuit configured to support first communication in a first frequency band, connecting to an external electronic device via the first communication, receiving a first signal including a first designated identification information from the external electronic device by using the first communication, based on a second communication circuit configured to support second communication in a second frequency band different from the first frequency band, detecting a second signal of the external electronic device, the second signal broadcasting a second designated identification information, by using the second communication, and determining whether the first identification information included in the first signal and the second identification information broadcasted by the second signal correspond to each other.

According to various embodiments, the determining on corresponding of the information may include determining that the first identification information included in the first signal and the second identification information broadcasted by the second signal correspond to each other, transmitting, to the external electronic device, a third signal for requesting connection of the second communication with the external electronic device, by using the first communication, connecting to the external electronic device via the second communication, based on a response of the external electronic device to the request, and transmitting or receiving data, which is used to receive power from the external electronic device based on a power reception coil, to or from the external electronic device by using the second communication.

According to various embodiments, the first frequency band may include a frequency used in the power reception coil to wirelessly receive power from the external electronic device, and the first communication may include a communication scheme using a frequency the same as the frequency used in the power reception coil, or a frequency adjacent to the frequency used in the power reception coil within the first frequency band.

According to various embodiments, the designated identification information may include unique information at least temporarily generated by the external electronic device.

According to various embodiments, the designated identification information may include designated time information, and the receiving of the first signal may include recording the first designated identification information in the electronic device in response to the receiving of the first signal, and removing the recording of the designated identification information when a time corresponding to the designated time information has elapsed from the recording of the designated identification information.

According to various embodiments, the second communication may include at least one of Bluetooth low energy, Bluetooth, Wi-Fi, and near field communication (NFC).

According to various embodiments, the determining that the first identification information included in the first signal and the second identification information broadcasted by the second signal correspond to each other may include at least temporarily deactivating operation of the first communication.

According to various embodiments, the determining on corresponding of the information may include determining that the first identification information included in the first signal and the second identification information broadcasted by the second signal do not correspond to each other, and maintaining connection of the first communication with the external electronic device.

According to various embodiments, the transmitting or receiving of the data to or from the external electronic device may include transmitting at least one of a control error packet (CEP) and a received power packet (RPP), as at least a part of the data used to receive power from the external electronic device, by using the second communication.

An electronic device according to various embodiments described above may include a power transmission coil, a first communication circuit configured to support first communication in a first frequency band, a second communication circuit configured to support second communication in a second frequency band different from the first frequency band, and a control circuit electrically connected to the power transmission coil, the first communication circuit, and the second communication circuit.

According to various embodiments, the control circuit may be configured to connect to an external electronic device via the first communication based on the first communication circuit, receive a first signal including a first designated identification information from the external electronic device by using the first communication, detect a second signal of the external electronic device, the second signal broadcasting a second designated identification information, by using the second communication based on the second communication circuit, when it is determined that the first identification information included in the first signal and the second identification information broadcasted by the second signal correspond to each other, transmit, to the external electronic device, a third signal for requesting connection of the second communication with the external electronic device, by using the first communication, connect to the external electronic device via the second communication, based on a response of the external electronic device to the request, and transmit or receive data, which is used to transmit power to the external electronic device based on the power transmission coil, to or from the external electronic device, by using the second communication.

According to various embodiments, the control circuit may be configured to connect to an external electronic device via the first communication based on the first communication circuit, transmit a first signal including designated identification information to the external electronic device by using the first communication, transmit a second signal broadcasting the designated identification information, by using the second communication based on the second communication circuit, receive a third signal for requesting connection of the second communication with the electronic device from the external electronic device having detected the second signal, by using the first communication, connect to the external electronic device via the second communication, in response to the request, and transmit or receive data, which is used to transmit power to the external electronic device based on the power transmission coil, to or from the external electronic device, by using the second communication.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. By way of example, each of the phrases "at least one of A, B, and C" or "at least one of A, B, or C" refers to only A, only B, or only C; any combination of A, B, and C; and/or at least one of each of A, B, and C. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a power reception coil;
a first communication circuit configured to support a first communication in a first frequency band;
a second communication circuit configured to support a second communication in a second frequency band that is different from the first frequency band; and
a control circuit electrically connected to the power reception coil, the first communication circuit, and the second communication circuit, the control circuit configured to:
connect to an external electronic device via the first communication based on the first communication circuit;
receive a first signal including a first designated identification information from the external electronic device by using the first communication based on the first communication circuit;

detect a second signal of the external electronic device by using the second communication based on the second communication circuit, the second signal broadcasting a second designated identification information; and in case that the first identification information and the second identification information correspond to each other, transmit, to the external electronic device, a third signal for requesting connection of the second communication with the external electronic device by using the first communication, connect to the external electronic device via the second communication based on a response of the external electronic device to the requesting connection, and transmit or receive data to or from the external electronic device by using the second communication, the data being used to receive power from the external electronic device based on the power reception coil.

2. The electronic device of claim 1, wherein the first frequency band comprises a frequency used in the power reception coil to wirelessly receive power from the external electronic device, and the first communication comprises a communication scheme using a frequency that is same as the frequency used in the power reception coil, or a frequency that is adjacent to the frequency used in the power reception coil within the first frequency band.

3. The electronic device of claim 1, wherein the first designated identification information comprises unique information at least temporarily generated by the external electronic device.

4. The electronic device of claim 1, wherein the first designated identification information comprises designated time information, and the control circuit is further configured to record the first designated identification information in the electronic device in response to the receiving of the first signal, and remove the recording of the first designated identification information in case that a period of time indicated by the designated time information has elapsed from the recording of the first designated identification information.

5. The electronic device of claim 1, wherein the second communication is Bluetooth low energy, Bluetooth, Wi-Fi, or near field communication (NFC).

6. The electronic device of claim 1, wherein the control circuit is further configured to, in case that the first identification information and the second identification information does not correspond to each other, maintain connection of the first communication with the external electronic device.

7. The electronic device of claim 1, wherein the control circuit is configured to transmit a control error packet (CEP) or a received power packet (RPP) as the data used to receive power from the external electronic device, by using the second communication.

8. A wireless charging method of an electronic device, the method comprising:

based on a first communication circuit configured to support a first communication in a first frequency band, connecting to an external electronic device via the first communication;

receiving a first signal including a first designated identification information from the external electronic device by using the first communication;

based on a second communication circuit configured to support a second communication in a second frequency band that is different from the first frequency band, detecting a second signal of the external electronic device by using the second communication, the second signal broadcasting a second designated identification information; and determining whether the first identification information and the second identification information correspond to each other, wherein the determining on corresponding of the information comprises:

determining that the first identification information and the second identification information correspond to each other;

transmitting, to the external electronic device, a third signal for requesting connection of the second communication with the external electronic device by using the first communication;

connecting to the external electronic device via the second communication, based on a response of the external electronic device to the requesting connection; and transmitting or receiving data to or from the external electronic device by using the second communication, the data being used to receive power from the external electronic device based on a power reception coil.

9. The method of claim 8, wherein the first frequency band comprises a frequency used in the power reception coil to wirelessly receive power from the external electronic device, and the first communication comprises a communication scheme using a frequency that is same as the frequency used in the power reception coil, or a frequency that is adjacent to the frequency used in the power reception coil within the first frequency band.

10. The method of claim 8, wherein the first designated identification information comprises unique information at least temporarily generated by the external electronic device.

11. The method of claim 8, wherein the first designated identification information comprises designated time information, and wherein the receiving comprises:

recording the first designated identification information in the electronic device in response to the receiving of the first signal; and removing the recording of the designated identification information in case that a period of time indicated by the designated time information has elapsed from the recording of the first designated identification information.

12. The method of claim 8, wherein the second communication is Bluetooth low energy, Bluetooth, Wi-Fi, or near field communication (NFC).

13. The method of claim 8, wherein the determining on corresponding of the information comprises:

determining that the first identification information and the second identification information does not corresponding to each other; and maintaining connection of the first communication with the external electronic device.

14. The method of claim 8, wherein the transmitting or receiving of the data comprises transmitting a control error packet (CEP) or a received power packet (RPP) as the data used to receive power from the external electronic device, by using the second communication.

\* \* \* \* \*